(12) United States Patent
Heeger et al.

(10) Patent No.: US 12,177,778 B2
(45) Date of Patent: Dec. 24, 2024

(54) SECURE ENERGY CONSTRAINED MESH NETWORK

(71) Applicant: Roper Solutions, Inc., Austin, TX (US)

(72) Inventors: Derek S. Heeger, Albuquerque, NM (US); Maeve Garigan, San Marcos, TX (US)

(73) Assignee: Roper Solutions, Inc., Austin, TX (US)

(*) Notice: Subject to any disclaimer, the term of this patent is extended or adjusted under 35 U.S.C. 154(b) by 611 days.

(21) Appl. No.: 17/449,664

(22) Filed: Sep. 30, 2021

(65) Prior Publication Data

US 2022/0104123 A1 Mar. 31, 2022

Related U.S. Application Data

(60) Provisional application No. 63/198,163, filed on Sep. 30, 2020.

(51) Int. Cl.
H04W 52/02 (2009.01)
G06F 8/65 (2018.01)
H04L 9/32 (2006.01)
H04W 12/03 (2021.01)
H04W 56/00 (2009.01)
H04W 84/18 (2009.01)

(52) U.S. Cl.
CPC ......... *H04W 52/0216* (2013.01); *G06F 8/65* (2013.01); *H04L 9/3242* (2013.01); *H04W 12/03* (2021.01); *H04W 56/001* (2013.01); *H04L 2209/805* (2013.01); *H04W 84/18* (2013.01)

(58) Field of Classification Search
CPC .... G06F 9/3836; G06F 9/3555; H04W 24/08; H04W 16/14; H04W 56/0015; H04W 24/10; H04W 52/0216; H04L 9/3242
See application file for complete search history.

(56) References Cited

U.S. PATENT DOCUMENTS

| 7,705,736 | B1 | 4/2010 | Kedziora |
| 8,816,864 | B2 | 8/2014 | Menachem et al. |
| 10,242,547 | B1 | 3/2019 | Struhsaker et al. |
| 2002/0010390 | A1* | 1/2002 | Guice ............... G16H 50/20 600/300 |
| 2008/0048837 | A1 | 2/2008 | Montgomery et al. |

(Continued)

FOREIGN PATENT DOCUMENTS

WO 2019040721 A2 2/2019

OTHER PUBLICATIONS

Riaboff et al., "Considering pre-processing of accelerometer signal recorded with sensor fixed on dairy cows is a way to improve the classification of behaviors," Aug. 2019, 8 pgs.

(Continued)

*Primary Examiner* — Iqbal Zaidi
(74) *Attorney, Agent, or Firm* — Schafer IP Law; Richard A. Schafer

(57) ABSTRACT

An energy-constrained wireless mesh network is disclosed suitable for unattended sensor devices in rural or off-grid areas. The mesh network can be used in both a secure and insecure mode as desired. A series of rounds is used to communicate synchronously between a base station and wireless devices that are multiple hops away from the base station. Adaptive data rate techniques may be used to optimize data exchanges between networked devices.

17 Claims, 27 Drawing Sheets

(56) References Cited

U.S. PATENT DOCUMENTS

| | | | |
|---|---|---|---|
| 2011/0148639 | A1 | 6/2011 | Geissler et al. |
| 2012/0201277 | A1 | 8/2012 | Tanner et al. |
| 2012/0239303 | A1 | 9/2012 | Rajkondawar et al. |
| 2013/0138389 | A1 | 5/2013 | Gyöngy et al. |
| 2014/0338447 | A1 | 11/2014 | Sharpe et al. |
| 2014/0352632 | A1 | 12/2014 | McLaughlin |
| 2015/0039239 | A1 | 2/2015 | Shuler et al. |
| 2015/0282457 | A1 | 10/2015 | Yarden |
| 2017/0042119 | A1 | 2/2017 | Garrity |
| 2017/0127241 | A1* | 5/2017 | Sjölund ............... G01S 5/02213 |
| 2017/0127959 | A1 | 5/2017 | Paulussen et al. |
| 2017/0257439 | A1* | 9/2017 | Wang .................. H04L 12/4641 |
| 2018/0132449 | A1 | 5/2018 | Auer |
| 2018/0146645 | A1 | 5/2018 | Arbel |
| 2018/0325382 | A1 | 11/2018 | Brandao et al. |
| 2018/0333244 | A1 | 11/2018 | Hanks et al. |
| 2018/0364361 | A1 | 12/2018 | Liu et al. |
| 2022/0388505 | A1* | 12/2022 | Sharma Banjade ......................... G08G 1/096783 |

OTHER PUBLICATIONS

Sarker et al., "A Survey on LoRa for IoT Integrating Edge Computing," 2019 Fourth International Conference on Fog and Mobile Edge Computing (FMEC), Aug. 15, 2019, 6pgs., IEEE, https://doi.org/10.1109/FMEC.2019.8795313.

Schön et al., "Altered Vocalization Rate During the Estrous Cycle in Dairy Cattle," J. Dairy Sci., 2007, vol. 90, No. 1, 202-206, American Dairy Science Association.

Sharma et al., "LoRaWAN-Based Energy-Efficient Surveillance by Drones for Intelligent Transportation Systems," Energies 2018, Mar. 6, 2018, 26 pgs., vol. 11, No. 3, MDPI, https://doi.org/10.3390/en11030573.

Skorobogatov, "Flash Memory 'Bumping' Attacks," Proceedings of the 12th international conference on Cryptographic hardware and embedded systems (CHES 2010), 2010, pp. 158-172., vol. 6225, Springer, Berlin, Germany.

Slabicki te al., "Adaptive Configuration of LoRa Networks for Dense IoT Deployments," NOMS 2018-2018 IEEE/IFIP Network Operations and Management Symposium, Jul. 9, 2018, 9 pgs., IEEE, https://doi.org/10.1109/NOMS.2018.8406255.

Van De Velde, "Multi-hop LoRaWAN: including a forwarding node," 2017, 8 pgs., https://texus.me/files/Paper%20Multi-hop%20LoRaWAN.pdf.

Velenza et al., "Assessment of an accelerometer system for detection of estrus and treatment with gonadotropin-releasing hormone at the time of insemination in lactating dairy cows," J. Dairy Sci., Dec. 2012, vol. 95, No. 2, 7115-7127, American Dairy Science Association.

Walton et al., "Evaluation of sampling frequency, window size and sensor position for classification of sheep behaviour," R. Soc. Open Science, Jan. 2018, vol. 5, 171332, 14 pgs.

Watts et al., "Vocal behaviour in cattle: the animal's commentary on its biological processes and welfare (Abstract only)," Appl. Anim. Behav. Sci., Mar. 22, 2000, vol. 67, Nos. 1-2, 1533.

Yin et al., "Estrus Detection in Dairy Cows from Acceleration Data using Self-learning Classification Models," Oct. 2013, J. of Computers, vol. 8, No. 10, 2590-2597.

Zhou et al., "Side-Channel Attacks: Ten Years After Its Publication and the Impacts on Cryptographic Module Security Testing," 2005, 34 pgs.

Dieng et al., "Outdoor Localization and Distance Estimation Based on Dynamic RSSI Measurements in LoRa Networks Application to Cattle Rustling Prevention," 2019 International Conference on Wireless and Mobile Computing, Networking and Communications (WiMob), 2019, 6 pgs., IEEE.

Panicker et al., "A LoRa Wireless Mesh Network for Wide-Area Animal Tracking," 2019 IEEE International Conference on Electrical, Computer and Communication Technologies (ICECCT), Oct. 17, 2019, 5 pgs., IEEE.

"Actility + ST = LoRaWAN Firmware Update OTA with Production Servers," "The ST blog," 2 pgs/, ST life.augmented, https://blog.st.com/actility-lorawan-firmware-update-fuota/, last visited Sep. 30, 2021.

"Cow Monitoring Solutions," https://www.afimilk.com/, 2019-2020, 5 pgs.

"COWLAR A smart cow collar," https://cowlar.com/assets/website/downloads/cowlar-sales-onePager.pdf, Mar. 16, 2017, 2 pgs.

"CowScout," https://www.gea.com/en/products/activity-detection-cowscout.jsp, Visited Apr. 6, 2020, 3 pgs.

"CowSense Nx Gen," https://midwestmicro.us/cowsense, Visited Apr. 6, 2020, 2 pgs.

"DeLaval activity meter system," https://www.delaval.com/globalassets/inriver-resources/document/brochure/delaval-activity-meter-system.pdf, Aug. 29, 2016, 6 pgs.

"HerdDogg," https://herddogg.com, Visited Apr. 6, 2020, 5 pgs.

"Ida technology," https://ida.io/ida-technology/, Visited Apr. 6, 2020, 2 pgs.

"LiveView GPS," https://www.liveviewgps.com/all+gps+tracking+products.html, Visited Apr. 6, 2020, 4 pgs.

"Ovi-Bovi Automated cow activity monitoring," http://ovi-bovi.com/en/cow-activity-monitoring.html, Visited Apr. 6, 2020, 3 pgs.

"Success story Klaas Anne Jellema—Nedap Livestock Management," https://www.nedap-livestockmanagement.com/testimonial/klaas-ane-jellema/, visited Apr. 6, 2020, 6 pgs.

"SX1276/77/78/79—137 MHz to 1020 MHz Low Power Long Range Transceiver," Aug. 2016, 133 pgs., Rev. 5, Semtech Corporation, Camarillo, CA, USA.

"The CowManager System," https://www.cowmanager.com/en-us/Solution/System, Visited Apr. 6, 2020, 3 pgs.

"Vence," http://vence.io, 2018, 4 pgs.

"Viasat Enterprise Broadband Terminals, Next Generation Enterprise Broadband Access over Satellite," Viasat Inc., 2017, 2 pgs.

"VitalHerd," http://www.vitalherd.com/, Visited Apr. 6, 2020, 4 pgs.

Abdelfadeel et al., "Fair Adaptive Data Rate Allocation and Power Control in LoRaWAN," "2018 IEEE 19th International Symposium on "A World of Wireless, Mobile and Multimedia Networks" (WoWMoM)," Aug. 30, 2018, 9 pgs., IEEE, Chania, Greece.

Abdelfadeel et al., "How to make Firmware Updates over LoRaWAN Possible," Feb. 20, 2020, 11 pgs., ResearchGate, https://www.researchgate.net/publication/339398965_How_to_make_Firmware_Updates_over_LoRaWAN_Possible.

Anastasiou et al., "IoT Device Firmware Update over LoRa: The Blockchain Solution," "2020 16th International Conference on Distributed Computing in Sensor Systems (DCOSS)," Sep. 1, 2020, pp. 404-411, IEEE, Marina del Rey, CA, USA.

Benaissa et al., "Behaviours recognition using neck-mounted accelerometers in dairy barns," Sep. 2017, 6 pgs.

Blomberg, "Automatic registration of dairy cows grazing behaviour on pasture," 2011, 31 pages, Swedish University of Agricultural Sciences Department of Animal Nutrition and Management.

Bor et al., "Do LoRa Low-Power Wide-Area Networks Scale?," "MSWiM '16: Proceedings of the 19th ACM International Conference on Modeling, Analysis and Simulation of Wireless and Mobile Systems," Nov. 13, 2016, pp. 59-67 Association for Computing MachineryNew YorkNYUnited States.

Bor et al., "LoRa Transmission Parameter Selection," "2017 13th International Conference on Distributed Computing in Sensor Systems" Jan. 29, 2018, pp. 27-34, IEEE, Ottawa, ON, Canada.

Bouguera et al., "Energy Consumption Model for Sensor Nodes Based on LoRa and LoRaWAN," Sensors 2018, Jun. 30, 2018, 23 pgs., vol. 18, No. 7, MDPI, https://doi.org/10.3390/s18072104.

Butun et al., "Security Risk Analysis of LoRaWAN and Future Directions," Future Internet 2019, Dec. 21, 2018, 22 pgs., vol. 11, No. 3, MDPI, https://doi.org/10.3390/fi11010003.

Casals et al., "Modeling the Energy Performance of LoRaWAN," Sensors 2017, Oct. 16, 2017, 30 pgs., vol. 17, No. 10, MDPI, https://doi.org/10.3390/s17102364.

Centelles et al., "A LoRa-Based Communication System for Coordinated Response in an Earthquake Aftermath," Proceedings 2019, Nov. 21, 2019, 2 pgs., vol. 31, No. 1, MDPI, https://doi.org/10.3390/proceedings2019031073.

(56) References Cited

OTHER PUBLICATIONS

Cilfone et al., "Wireless Mesh Networking: An IoT-Oriented Perspective Survey on Relevant Technologies," Future Internet 2019, Apr. 17, 2019, 35 pgs. vol. 11, No. 4, MDPI, https://doi.org/10.3390/fi11040099.

De La Torre et al., "Acoustic analysis of cattle (*Bos taurus*) mother-offspring contact calls from a source-filter theory perspective," Applied Animal Behaviour Science, Feb. 2015, vol. 163, 58-68.

Dias et al., "LoRaWAN multi-hop uplink extension," Procedia Computer Science, Apr. 24, 2018, pp. 424-431, vol. 130, Elsevier B.V., https://doi.org/10.1016/j.procs.2018.04.063.

Ebi et al., "Synchronous LoRa Mesh Network to Monitor Processes in Underground Infrastructure," IEEE Access, Apr. 30, 2019, pp. 57663-57677, vol. 7, IEEE, https://doi.org/10.1109/ACCESS.2019.2913985.

Germani et al., "An IoT Architecture for Continuous Livestock Monitoring Using LoRa LPWAN," Electronics 2019, Dec. 1, 2019, 28 pgs., vol. 8, No. 12, MDPI, https://doi.org/10.3390/electronics8121435.

Grandin, "Cattle vocalizations are associated with handling and equipment problems at beef slaughter plants," Mar. 2, 2001, Appl. Anim. Behav. Sci., vol. 71, No. 3, 191-201.

Green et al., "Vocal individuality of Holstein-Friesian cattle is maintained across putatively positive and negative farming contexts," Sci Rep 9, 18468, 2019, 9 pgs.

Hauser et al., "Proposal of Adaptive Data Rate Algorithm for LoRaWAN-based Infrastructure," 2017 IEEE 5th International Conference on Future Internet of Things and Cloud (FiCloud), Nov. 20, 2017, pp. 85-90, IEEE, https://doi.org/10.1109/FiCloud.2017.47.

Heeger et al., "Adaptive Data Rate Techniques for Energy Constrained Ad Hoc LoRa Networks," 2020 Global Internet of Things Summit (GIoTS), Jun. 17, 2020, 6pgs., IEEE, https://doi.org/10.1109/GIOTS49054.2020.9119581.

Heeger et al., "Lithium Battery Health and Capacity Estimation Techniques Using Embedded Electronics," 2017, 39 pgs., Sandia National Laboratories, United States, https://www.osti.gov/servlets/purl/1596204.

Heeger et al., "Secure Energy Constrained LoRa Mesh Network," AdHoc-Now 2020 : The 19th International Conference on Ad Hoc Networks and Wireless, Oct. 2020, pp. 228-240, Springer Nature Switzerland AG, https://doi.org/10.1007/978-3-030-61746-2_17.

Heeger et al., "Secure LoRa Firmware Update with Adaptive Data Rate Techniques," Sensors 2021, Mar. 30, 2021, 17 pgs., vol. 21, No. 7, MDPI, https://doi.org/10.3390/s21072384.

Hossain et al., eds., "Wireless mesh networks: architectures and protocols," 2008, 351 pgs., Springer Science +Business Media, LLC, New York, USA.

Kim et al., "Contention-Aware Adaptive Data Rate for Throughput Optimization in LoRaWAN," Sensors 2018, May 25, 2018, 18 pgs., vol. 18, No. 6, MDPI, https://doi.org/10.3390/s18061716.

Kousias et al., "Empirical Analysis of LoRaWAN Adaptive Data Rate for Mobile Internet of Things Applications," S3'19: Proceedings of the 2019 on Wireless of the Students, by the Students, and for the Students Workshop, Oct. 2019, pp. 9-11, ACM, https://doi.org/10.1145/3349621.3355727.

Lee et al., "Monitoring of Large-Area IoT Sensors using a LoRa Wireless Mesh Network System: Design and Evaluation," IEEE Transactions on Instrumentation and Measurement, vol. 67, No. 9, pp. 2177-2187, IEEE, https://doi.org/10.1109/TIM.2018.2814082.

Li et al., "How Agile is the Adaptive Data Rate Mechanism of LoRaWAN?," 2018 IEEE Global Communications Conference (GLOBECOM), Feb. 21, 2019, 6 pgs., IEEE, https://doi.org/10.1109/GLOCOM.2018.8647469.

Liao et al., "Multi-Hop LoRa Networks Enabled by Concurrent Transmission," IEEE Access, Sep. 22, 2017, pp. 1430-21446, vol. 5,IEEE, https://doi.org/10.1109/ACCESS.2017.2755858.

LoRa Alliance, "LoRa Alliance™ Enhances LoRaWAN™ Protocol with New Specifications to Support Firmware Updates Over the Air," Oct. 25, 2018, LoRa Alliance, https://lora-alliance.org/wp-content/uploads/2018/10/2018-10-23_LA_FUOTA-PR-Final.pdf.

LoRa Alliance, "LoRaWAN 1.0.3 Specification," 2018, 72 pgs., LoRa Alliance, Inc., Beaverton, United States.

Lundell et al., "A Routing Protocol for LoRA Mesh Networks," 2018 IEEE 19th International Symposium on "A World of Wireless, Mobile and Multimedia Networks" (WoWMoM), Aug. 30, 2018, 6 pgs., IEEE, https://doi.org/10.1109/WoWMoM.2018.8449743.

Mekki et al., "A comparative study of LPWAN technologies for large-scale IoT deployment," ICT Express, Mar. 2019, pp. 1-7, vol. 5, No. 1, the Korean Institute of Communications and Information Sciences, https://doi.org/10.1016/j.icte.2017.12.005.

Premsankar et al., "Optimal Configuration of LoRa Networks in Smart Cities," IEEE Transactions on Industrial Informatics , Feb. 13, 2020, vol. 16, No. 12, IEEE, https://doi.org/10.1109/TII.2020.2967123.

\* cited by examiner

SECURE ENERGY CONSTRAINED MESH NETWORK

CROSS-REFERENCE TO RELATED APPLICATIONS

The present application claims the benefit of U.S. Provisional App. No. 63/198,163, filed Sep. 30, 2020, and entitled "Secure Energy Constrained Mesh Network," which is incorporated herein in its entirety for all purposes.

TECHNICAL FIELD

The present invention relates to the field of networking, and in particular to a secure energy-constrained wireless ad hoc mesh network.

BACKGROUND ART

In recent years, the use of distributed wireless sensor platforms, such as Internet of Things (IoT) devices, has expanded rapidly into commercial, industrial, and consumer applications. This expansion has driven a corresponding need for energy-efficient wireless networking approaches. The energy consumed during data communications is a significant fraction of the total energy consumption for sensor platforms, and is a particular concern for networked sensor applications in rural areas, where wireless data transmission over long distances is necessary due to a lack of networking infrastructure. Low-power wide-area network (LPWAN) technologies such as LoRa® (Long Range), Sigfox®, Long Term Evolution for Machines (LTE-M), and Narrowband IoT (NB-IoT) offer a distinct advantage for rural IoT by providing enhanced energy efficiency and long-range data communications. (LORA is a registered trademark of Semtech Corporation. SIGFOX is a registered trademark of SIGFOX S.A.)

LoRa networks use a proprietary spread spectrum modulation type of chirp spread spectrum (CSS) modulation to achieve high noise immunity at the expense of low data rates. LoRa has configurable parameters such as spreading factor (SF), bandwidth, and error coding rates, which enable trade-offs between range and noise immunity. Given its low cost to build and operate, LoRa has received a great deal of interest from the academic and amateur radio communities and has been used in various IoT applications, such as smart cities, industrial IoT, agriculture, smart metering, and environmental monitoring. We use LoRa as the networking approach as discussed herein because LoRa radio technology is widely accessible and popular, although the described techniques can be applied to other wireless networking methods for both IoT networks (i.e. connected to the Internet) or networks that are not connected to the Internet.

LoRa is used as the physical (PHY) layer for the LoRa Wide-Area Network (LoRaWAN®) networking protocol in which LoRa-enabled devices communicate directly with LoRa gateways. (LORAWAN is a registered trademark of Semtech Corporation.) LoRaWAN is a wide-area network technology that is optimized for low data rate communications in the unlicensed spectrum bands. It is designed to connect directly to a LoRaWAN gateway that can route relevant data to the Internet. There are three classes of LoRaWAN (Classes A, B, and C) that offer different functionalities with different power consumption profiles.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

Figure 1:
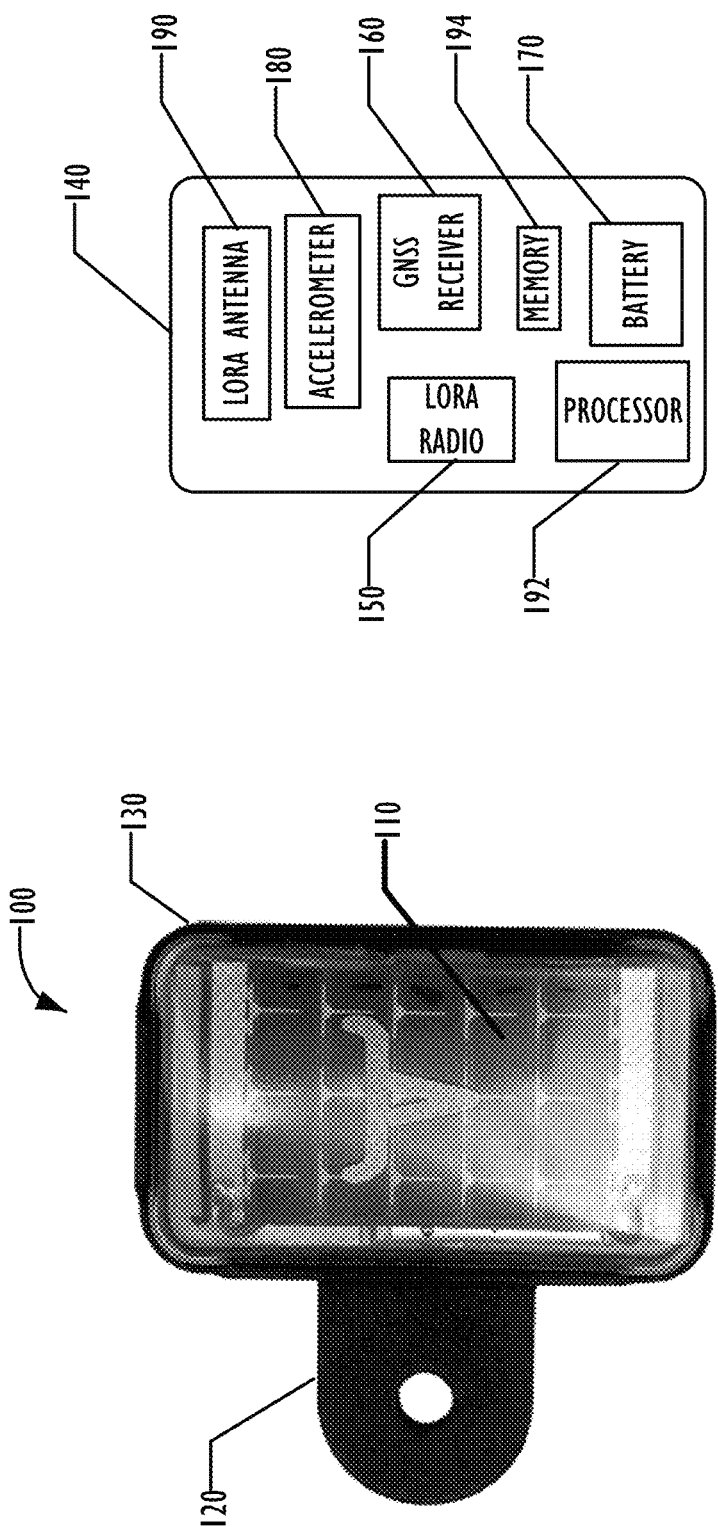
FIG. 1 is a top view and a block diagram of a cattle sensor according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form to avoid obscuring the invention. References to numbers without subscripts are understood to reference all instances of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments can implement the features and functionality described herein in software, firmware, or hardware as desired, including any combination of software, firmware, and hardware. References to daemons, drivers, engines, modules, integrated circuits (ICs), or routines should not be considered as suggesting a limitation of the embodiment to any type of implementation.

Although adaptive data rate (ADR) and wireless mesh networking capabilities exist in the LoRaWAN specification, none of the existing LoRaWAN operating modes are sufficiently optimized for networking highly energy-constrained mobile devices. To address this, we have developed a custom networking layer that uses the LoRa PHY. LoRaWAN is not suitable for this purpose because it does not support the ability simultaneously to achieve extremely low power operation, communicate synchronously, use a mesh topology, and conduct secure, wireless exchanges of large amounts of data, such as wireless firmware updates.

We have developed a novel ad-hoc mesh network architecture for networking unattended mobile devices, one embodiment being tracking and monitoring the location and activity of a herd of free-range cattle. Our approach is not limited to cattle monitoring and is applicable to any mobile or energy-constrained wireless networked device. Within our system, battery-powered sensor platforms are attached to the cattle and periodically collect and transmit data of interest, including geolocation and accelerometer data, to a base station. Because of long transmission distances and physical obstacles (such as rolling hills, trees, and other cattle) the techniques disclosed below configure the sensor network as a mesh, allowing collected data to be relayed from sensor to sensor before reaching the base station. As described below, data transfer between the base station and the sensor platforms is bi-directional with ultra-low energy consumption. In addition, the mesh network should be secure, limiting access to the relayed data only to authorized recipients.

The system described below introduces a protocol and framework that enables secure and energy-optimized data communication over distances that exceed those specified for LoRaWAN networking. The disclosed framework uses clock data received from a Global Navigation Satellite System (GNSS) such as the Global Positioning System (GPS) to time synchronize all sensors in the network, although other timing devices, such as oscillators, can be used for time synchronization of the networked sensor platforms. This time synchronization between all sensor platforms enables precise wake-up times, which in turn enables the configuration of an infrequent, secure, and coherent data exchange network that minimizes energy consumption. Applications that use the disclosed system may benefit from the increased data transmission range and improved reliability and security of packet delivery.

A wireless mesh network (WMN) is a network communication paradigm wherein client devices can act as message relays and increase the probability of successful packet delivery. Mesh network architectures exist for multiple IoT standards, including Wi-Fi®, Bluetooth®, and Zigbee®. (WI-FI is a registered trademark of Wi-Fi Alliance. BLUETOOTH is a registered trademark of Bluetooth SIG, Inc. ZIGBEE is a registered trademark of Connectivity Standards Alliance.) Reactive and proactive routing protocols have been proposed within WMNs to define how the system discovers message routing. In proactive routing protocols, the IoT devices may maintain routing tables to represent the entire network topology, while in the reactive protocols, a multi-hop route may be created on-demand, thus reducing the routing overhead. WMNs have typically employed a route discovery phase to generate an internal forwarding table based on the message destination. The routes remain valid until the IoT device status changes (e.g., changes position or goes offline) which initiates a maintenance phase. The complexities of maintaining and updating routing tables can consume significant amounts of energy, making this approach unsuitable for our use case.

Various mesh architectures have been proposed for LoRa. In one such architecture, described in V. Sharma, I. You, G. Pau, M. Collotta, J. Lim, and J. Kim, "LoRaWAN-Based Energy-Efficient Surveillance by Drones for Intelligent Transportation Systems" (Energies, vol. 11, no. 3, p. 573, March 2018), a LoRa mesh network was designed to monitor underground infrastructure, which consists of stationary sensors that are configured as dedicated relay nodes to LoRaWAN gateways and use GPS time synchronization to minimize energy consumption. In that approach, a LPWAN was based on the LoRa physical layer (LoRa PHY) that supposedly overcomes the transmission limitations (i.e., medium-range underground connectivity and time stamping of data packets) of the LoRaWAN standard in underground applications. The LoRaWAN standard supports only single-hop communication, although in L. Germani, V. Mecarelli, G. Baruffa, L. Rugini, and F. Frescura, "An IoT Architecture for Continuous Livestock Monitoring Using LoRa LPWAN" (Electronics, vol. 8, no. 12, p. 1435, December 2019), multihop networking between LoRa gateways was proposed as a means of extending coverage. Their proposed multi-hop routing protocol integrated Hybrid Wireless Mesh Protocol (HWMP) and Ad-hoc On-Demand Distance Vector Routing (AODV) technologies into the LoRaWAN specification. Issues related to signal attenuation, particularly those related to obstacles and non-line-of-sight transmission, were addressed in R. P. Centelles, F. Freitag, R. Meseguer, L. Navarro, S. F. Ochoa, and R. M. Santos, "A LoRa-Based Communication System for Coordinated Response in an Earthquake Aftermath" (Proceedings, vol. 31, no. 1, p. 73, November 2019), where a mesh network that uses the LoRa PHY is developed and its packet delivery performance is evaluated. The authors demonstrated that their scheme provided a better packet delivery ratio than an alternative star-network topology, although the proposed scheme lacks security and low power operation.

Concurrent transmissions of IoT devices in multi-hop LoRa mesh networks are investigated in M. Slabicki, G. Premsankar, M. D. Francesco, "Adaptive Configuration of LoRa Networks for Dense IoT Deployments" (IEEE/IFIP Network Operations and Management Symposium (NOMS), pp. 1-9, April 2018) and S. Kim and Y. Yoo, "Contention-Aware Adaptive Data Rate for Throughput Optimization in LoRaWAN" (Sensors, vol. 18, no. 6, p. 1716, May 2018). In the Slabicki et al. article, scalability issues are investigated in large-scale LoRa networks where the authors show that LoRa networks configured with static settings and a single sink are not scalable. They propose a scheme that uses multiple sinks and dynamic communication parameter settings as an alternative. In the Kim et al. article, a scheme is proposed for improving packet delivery by introducing timing offsets between the packets. In K. Abdelfadeel, V. Cionca, D. Pesch, "Fair Adaptive Data Rate Allocation and Power Control in LoRaWAN" (2018 IEEE World of Wireless Mobile and Multimedia Networks (WoWMoM), June 2018), a network configuration is proposed wherein a forwarder-node is introduced between the IoT device and the gateway to improve the range and quality of LoraWAN communications. That work was extended in S. Li, U. Raza, and A. Khan, "How Agile is the Adaptive Data Rate Mechanism of LoRaWAN?" (2018 IEEE Global Communications Conference (GLOBECOM), pp. 206-212, 2018), using a Destination-Sequenced Distance Vector (DSDV) routing protocol where IoT devices are configured to transmit packets to intermediate relay nodes that forward the packets to LoRa gateways.

The aforementioned work on LoRa mesh networks focuses on performance and does not address network security within LoRa mesh networks. Moreover, only limited work exists on extending the effective communication range of LoRa devices while minimizing energy consumption. Our work addresses these gaps by introducing a custom ad-hoc network architecture (avoiding LoRaWAN) that uses the LoRa PHY and provides ultra-low-power operation while maintaining advanced capabilities within the network infrastructure, including mesh networking and a framework for authentication and encryption of sensor data using an efficient packet structure.

What we disclose herein is motivated by a realistic free-range cattle monitoring application that uses battery-powered sensor platforms to collect geolocation and accelerometer data that is transmitted via LoRa radio to a base station. Some of the challenges associated with monitoring free-range cattle using networked devices can be summarized as follows:

1. Cattle are highly mobile and travel long distances to unpredictable locations in rural, off-grid areas, making the communication link unreliable.
2. Cattle act as large dielectrics and can absorb a considerable amount of radio-frequency transmission energy, making the device communications range dependent on cattle orientation.
3. The sensor package must be small and lightweight, requiring a small battery, which creates a highly energy-constrained scenario.

To address these challenges, we developed a LoRa mesh network that uses adjacent LoRa-enabled devices, in this use-case sensor platforms that are affixed to cattle, to act as relays to transmit sensor data to the LoRa base station. Typical mesh network protocols are unsuitable for our cattle monitoring application because they consume significant energy, perform poorly when used in a mobile sensor network, and are insecure. Our mesh network architecture overcomes these shortfalls. As described below, each node in the WMN is a networked device worn by individual cattle, but the techniques are applicable to other implementations and use-cases.

Our system uses LoRa concurrent transmission capabilities and time synchronization using GPS clock data received by the mobile sensors to efficiently collect data from ultra-low-power sensors distributed over a large geographic area. Our system integrates lightweight encryption and authentication security functions into a LoRa mesh network to prevent packet sniffing, data spoofing, and intelligent denial of service (DoS) attacks. Our system is applied to a novel free-range cattle monitoring application, which introduces significant challenges to ensuring reliable packet delivery and ultra-low energy consumption. The system has been experimentally validated in a cattle ranch environment.

System Overview

The system has been integrated into a cattle monitoring sensor platform 100 illustrated in FIG. 1 as a top view and a block diagram of internal components. The relative size, position, and arrangement of internal components in FIG. 1 are illustrative only and selected for clarity of the drawing. Other components may be present. Examples of such sensor platforms are described in U.S. Pat. Pub. 20200323170, entitled "Solar-Powered Remote Monitoring Tag System for Animals," which is incorporated by reference herein in its entirety for all purposes. The sensor platforms 100 together form a mesh network, communicating with each other and a base station (not shown in FIG. 1). The sensor platform 100 includes a GNSS receiver 160, an accelerometer 180, and a LoRa radio module 150 for data communication, as well as a LoRa antenna 190, a processor or microcontroller 192, and a memory 194.

In most instances, the GNSS receiver 160 is a GPS receiver that provides both geolocation data and timing information at a high level of accuracy using the GPS system. However, other GNSSs exist, such as the Russian Global Navigation Satellite System (GLONASS), the Chinese BeiDou Navigation Satellite System (BDS), and the European Union's Galileo system, and receivers for use with those systems can be used instead if desired. Some receivers are capable of receiving data from multiple GNSSs.

The memory 194 may include non-volatile memory for storing firmware or software that controls the execution of the sensor platform 100 In one implementation, a mounting tab 120 allows for mounting the sensor platform 100 on an animal's ear using a ear tag button (not shown). Other techniques for attaching the sensor platform 100 to the animal's ear or elsewhere on the animal may be used, such as a collar or harness. In one implementation, the sensor platform 100 includes a low-capacity battery 170 that is recharged from a solar panel 110 disposed within a housing 130, however, implementations may use primary battery power and omit the use of solar panels, or apply alternative methods for autonomous power. The battery-powered sensor platform 100 with the LoRa receiver enabled can consume more than 5 mA of current, creating a significant power drain over time. The sensor platforms 100 can be configured to remain in an ultra-low-power mode; however, this makes them unable to receive messages. To maintain receptivity and ultra-low power consumption, the sensor platforms 100 are periodically and simultaneously awakened, which requires precise time synchronization among all sensor platforms 100 in the mesh network. In one implementation, GNSS-based time synchronization with guard bands may be used to achieve this goal. Other techniques for time synchronization may be used, including maintaining time with oscillators or other embedded timing devices. We define an "event" as a global awakening of all sensor platforms 100 in the mesh network and a complete data exchange between the LoRa base station and the sensor platforms 100. Events occur at fixed time intervals, e.g., once every 1-4 hours, and the sensor platforms 100 similarly awaken on a fixed schedule, such as every 0.25 hours, to collect sensor data, such as position and health information, and re-synchronize with the global clock. In some embodiments, the sensor platforms 100 may collect data locally on a different schedule than the components used for data exchange with other sensor platforms 100 and the base station 200.

System Behavior

Figure 2:
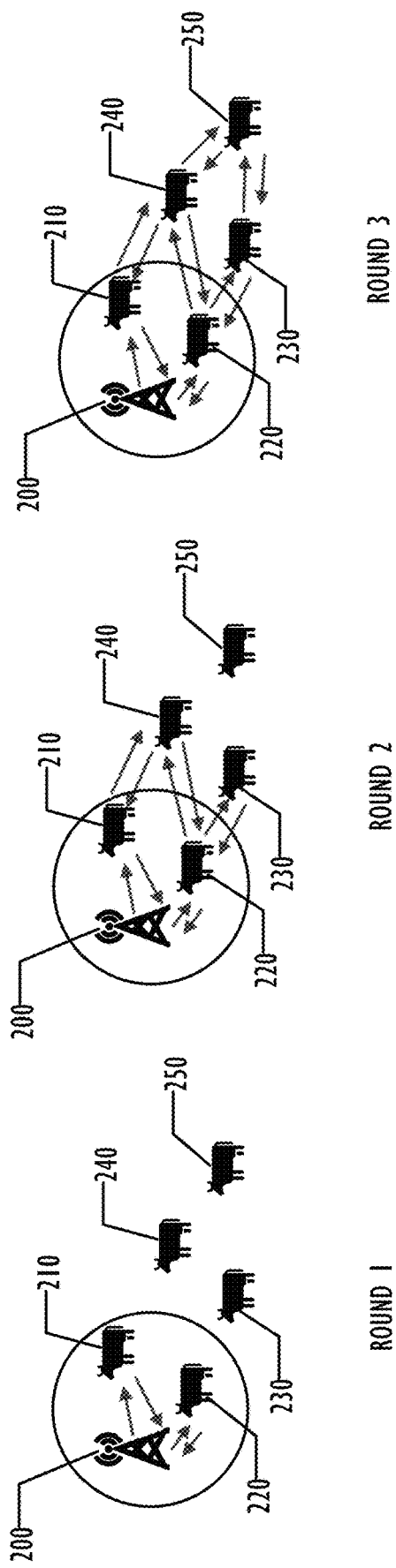
FIG. 2 is a set of block diagrams illustrating communication pathways within the mesh network in the context of Events and Rounds.

Free-range cattle may be at a significant distance from each other and the base station. The physical location of the cattle determines the number of hops required for the sensor data transmitted during an event to reach the base station. A series of R rounds is defined within the time frame of an event, with each round subdivided into synchronization (synch) frames (sometimes referred to as synch packets) and data frames (sometimes referred to as data packets). Each round defines a time interval in which data is collected from a subset of the sensor platforms 100. FIG. 2 is a block diagram illustrating a series of rounds where R=3 involving cattle 210-250, each of which wears a sensor platform 100. In the following, for simplicity of the discussion, sending a frame to a cow or receiving a frame from a cow should be understood as meaning sending the frame to or receiving the frame from the sensor platform 100 worn by that cow. Similarly, collecting data from a cow or communicating with a cow should be understood as collecting data from the sensor platform 100 worn by that cow and communicating with that sensor platform 100.

In this example, during Round 1, the base station 200 collects data from cows 210 and 220, which have a direct communication path because of their location relative to the base station 200. The cows 230-250, which are farther away, are not in direct communication with the base station 200. In example Rounds 2 and 3, the base station 200 collects data from cows that are one and two mesh hops away, respectively. Each round progresses one hop further from the previous round until all cows have responded. In each round, synch frames are broadcast outward (away from the base station), while data frames are broadcast inward (toward the base station) from a cow receiving a synch frame. Depending on its position in the mesh network, a cow may receive one or more synch frames, send one or more synch frames, or both. The cow may also broadcast one or more data frames, receive one or more data frames, or both. So, in the example illustrated in FIG. 2, in Round 2, cow 220 receives a synch frame from the base station 200, broadcasts a synch frame to cow 230 and cow 240, and receives data frames from cows 230 and 240.

Figure 3:
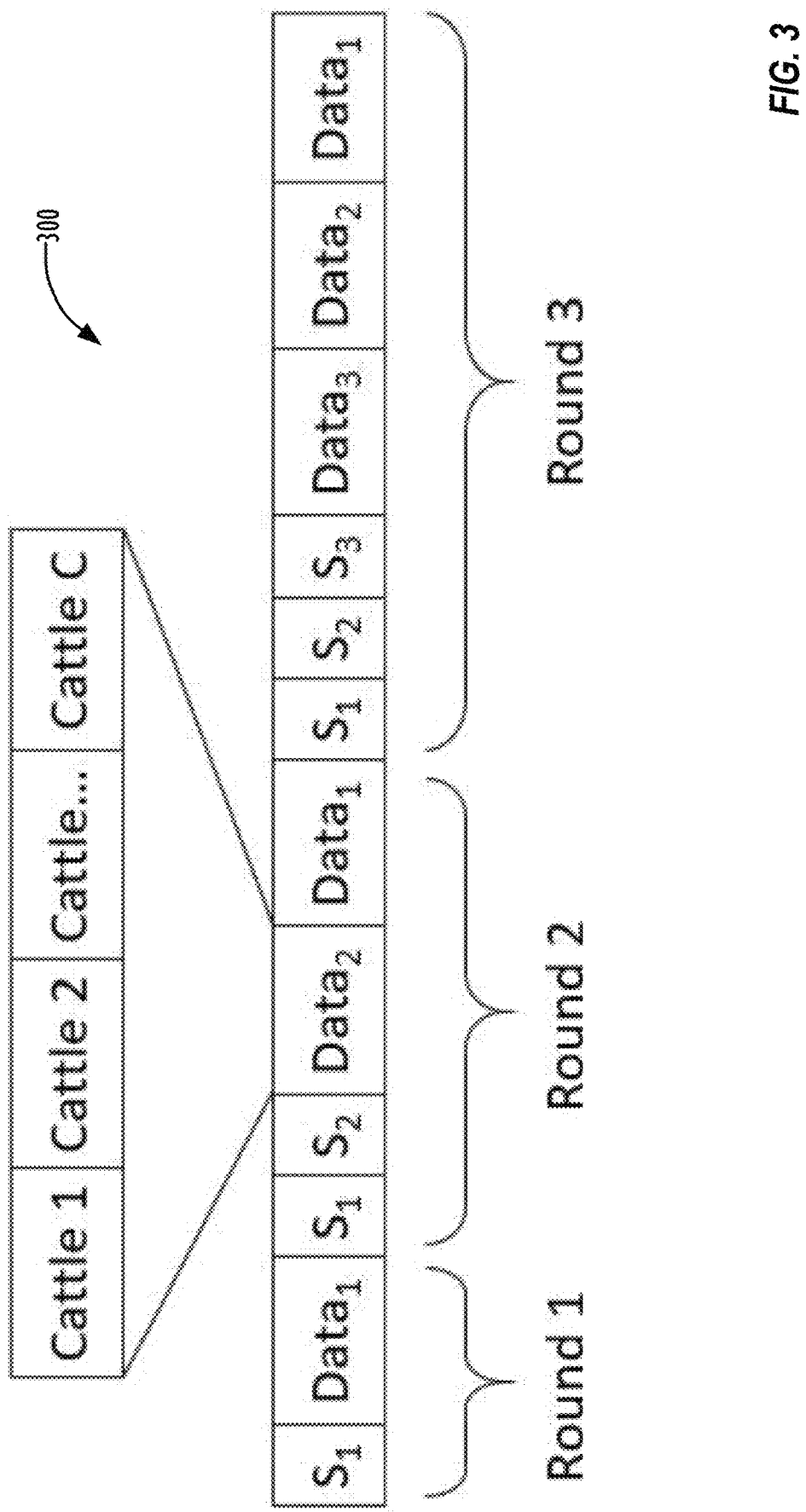
FIG. 3 is a block diagram illustrating an example sequence of synchronization and sensor data packets from multiple rounds during an event according to one embodiment.

The base station is responsible for transmitting synch packets to the sensor platforms 100 in each round, and they respond with data packets that travel back to the base station 200. FIG. 3 is a block diagram illustrating a packet sequence consisting of synch packets $S_x$ and sensor data packets $Data_x$. The synch packet $S_x$ initiates a data transmission operation from the sensor platforms 100 that receives the synch packet and enables a route-finding algorithm to determine a set of feasible routes. Each data packet $Data_x$ contains a time slot for each sensor platform 100, enabling each of them to communicate their unique GPS and accelerometer data to the base station 200. Thus data packet $Data_2$ is illustrated as containing time slots for cow 1 through cow C; however, some of those time slots may be empty if no data has been received from the corresponding cow.

The number of rounds required depends on the distribution of the sensor platforms 100 (which is equivalent to the distribution of the cattle that wear them). For example, if every sensor platform 100 was within range of the base station, only one round would be required. If there is a sequence of C cattle spaced equally at the communication range boundaries, C rounds would be required to collect all the data. An exception occurs when one or more sensor platforms 100 are unable to respond, such as when the corresponding cow is out of communication range with all other cattle. This scenario can result in empty rounds unless a stop condition is incorporated. Two possible stop criteria are limiting the number of rounds to a fixed upper bound or terminating after a round occurs in which no data is collected.

Packet Structure

Figure 4:
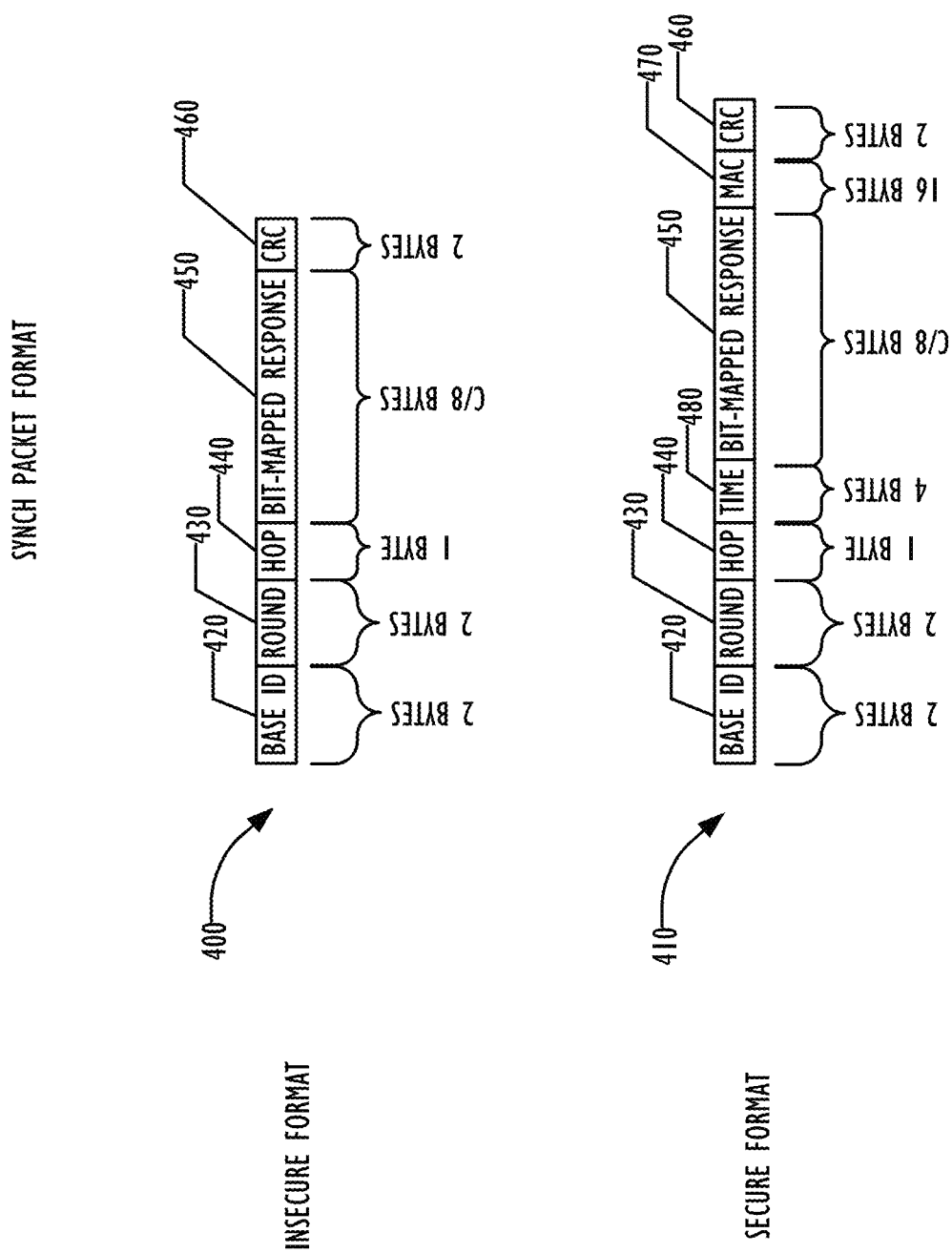
FIG. 4 is a block diagram illustrating an insecure synchronization packet format and a secure synchronization packet format according to one embodiment.

FIG. 4 is two block diagrams illustrating two formats of a synch packet, an insecure format 400 and a secure format 410 according to one embodiment. Both packet formats include a 2-byte Base ID field 420 to identify the base station 200 from which the packet originated. A 1-byte Round field 430 is incremented at the end of each round, indicating how many synch packets have been sent by the base station 200, and a 1-byte Hop field 440 is incremented at each mesh hop, indicating a distance in hops from the base station 200. The C/8 byte Bitmapped Response field 450 records which cattle have responded and the base station 200 has received their data, where one bit is allocated for each cow 1-C, making the packet size dependent on the number of cattle C. A 2-byte cyclic redundancy check (CRC) code 460 is appended to the packet to enable the detection of packet transmission errors. The secure version includes a 16-byte digital signature or message authentication code (MAC) and a 4-byte timestamp field Time, which increase the size of the secure format 410 packet by 20-bytes over the size of the insecure format 400. The digital signature may be encrypted using a 128-bit version of the Advanced Encryption Standard (AES) algorithm, commonly referred to as AES Cipher-based Message Authentication Code (AES-CMAC), although other encryption algorithms may be used. The purpose of the security-related components of the packet is discussed further below. The arrangement and sizes of fields in the insecure format 400 and secure format 410 are illustrative and by way of example only, and other arrangements and sizes of fields may be used. Other fields may be included in either packet format as desired.

Figure 5:
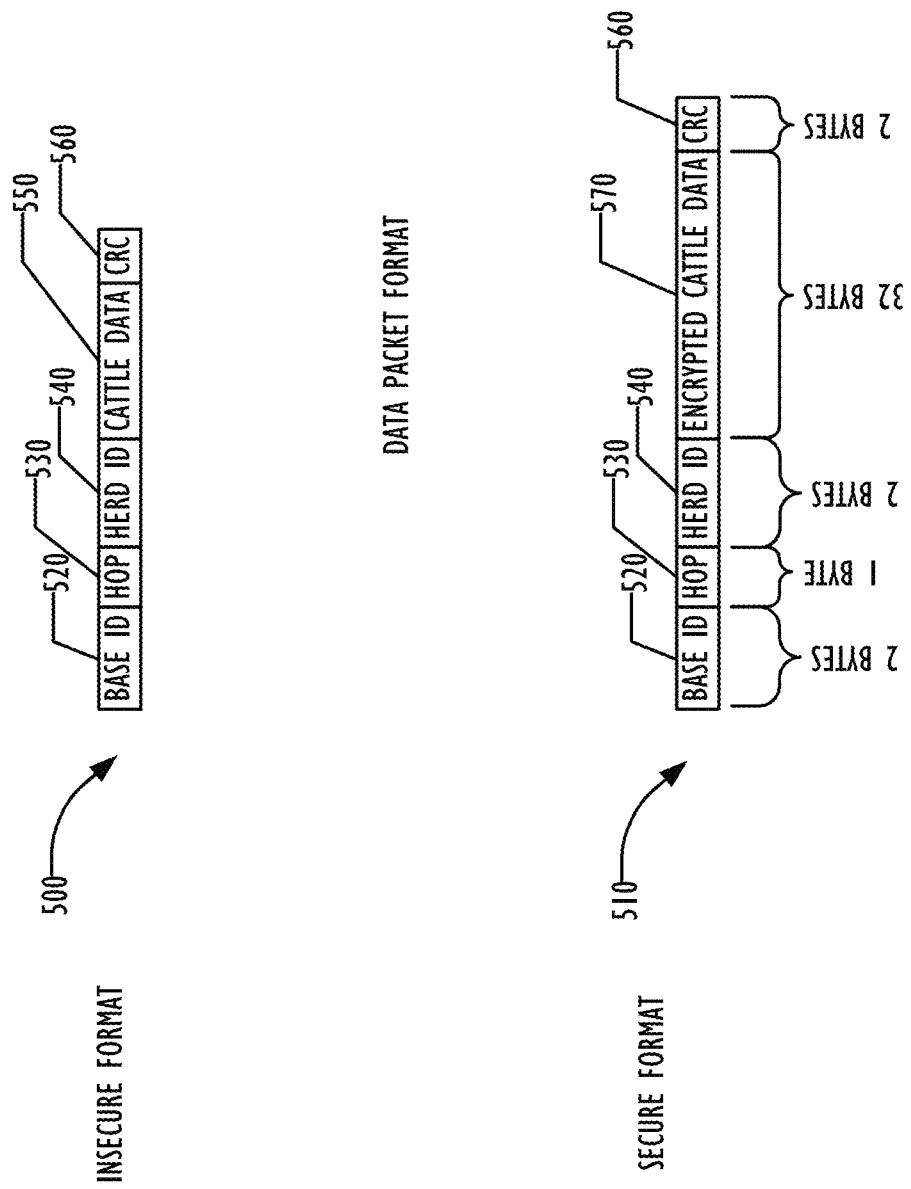
FIG. 5 is a block diagram illustrating an insecure data packet format and an insecure data packet format according to one embodiment.

Similarly, FIG. 5 is two block diagrams illustrating insecure and secure data packet formats 500, 510 for individual cattle according to one embodiment. The Base ID field 520, Hop Count field 530, and CRC field 560 serve the same purpose as described above for the synch packet and are typically the same size as their counterparts in the synch packet. The Herd ID field 540 indicates the cow that is the source of the data. The Cattle Data field 550 payload portion of the insecure data packet consists of 25-bytes of information related to the cow's current location and recent activity. The Encrypted Cattle Data 570 payload portion of the secure packet is extended to 32-bytes and may include a 4-byte timestamp and 0-padding as needed, to match the input width of an encryption algorithm such as AES-128. The arrangement and sizes of fields in the insecure packet format 500 and secure packet format 510 are illustrative and by way of example only, and other arrangements and sizes of fields may be used. Other fields may be included in either packet format as desired.

Transmit and Receive Logic

Figure 6:
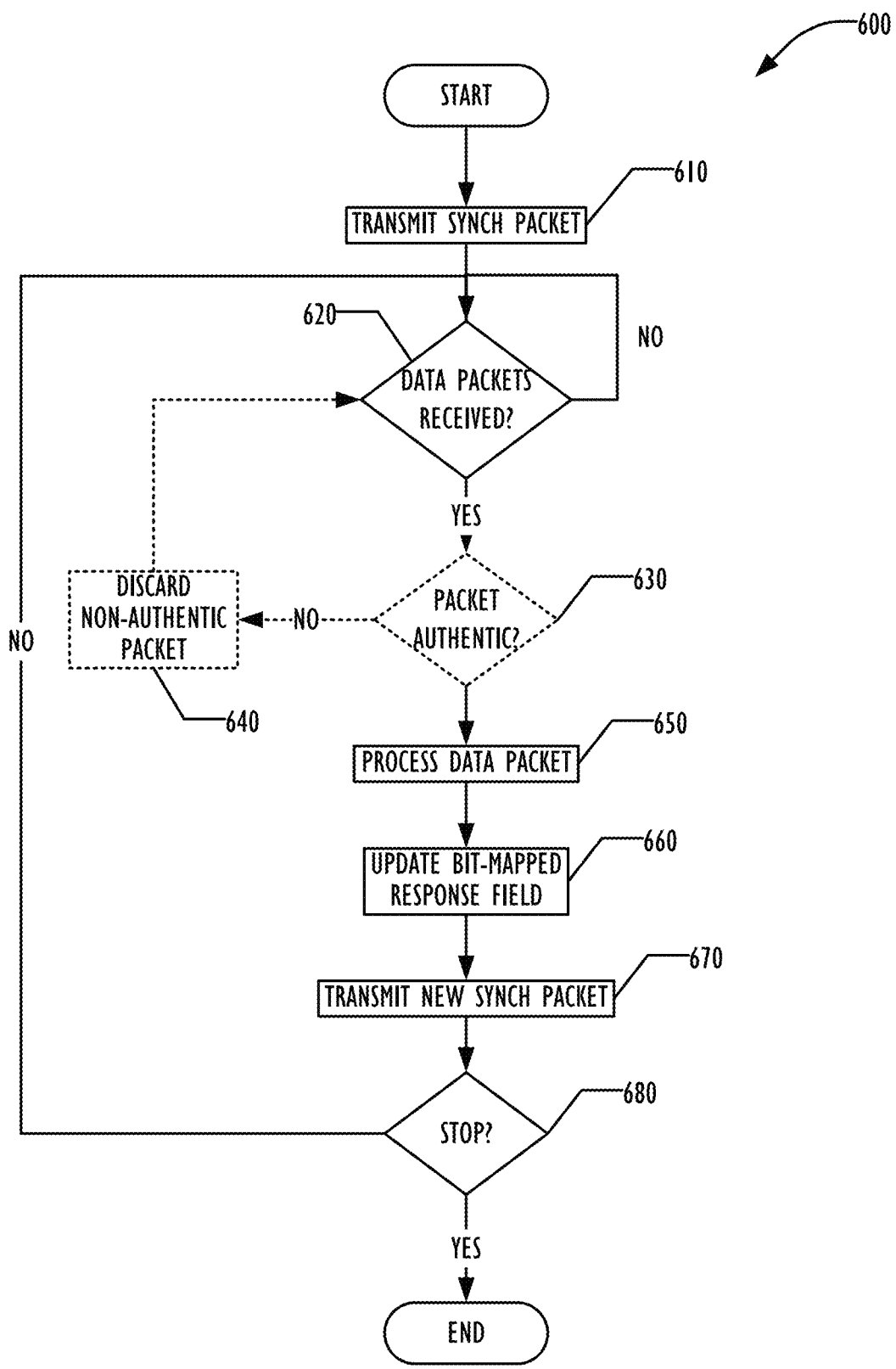
FIG. 6 is a flowchart illustrating a technique for operating a base station according to one embodiment.

The LoRa base station 200 enables ad-hoc mesh networking using a protocol such as the message exchange protocol illustrated in the flowchart 600 of FIG. 6. In block 610, the base station 200 transmits a synch packet with the bit-mapped response field 450 set to 0. In block 620, the base station 200 waits for data packets to arrive from the responding cattle sensor platforms 100. In block 630, the base station confirms the authenticity of each received data packet (secure version only and discards non-authentic packets in block 640. Blocks 630 and 640 are illustrated in dotted lines because these actions are omitted when using the insecure data packet format 500.

In block 650, the base station 200 may process the data received in a data packet and perform whatever actions are appropriate for that data. Now a new data packet may be sent with an updated bit-mapped response field 450, setting the bit corresponding to the cow and sensor platform 100 whose data was received in the data packet to 1 in block 660 before transmitting a new synch packet in block 670 with the updated bit-mapped response field 450.

In block 680, if no stop condition is met, the base station repeats the procedure at block 620. If a stop condition is met, the base station stops sending synch packets.

Unlike traditional mesh networks, there is no distinct routing and data exchange phase. Instead, the mesh network discovers the route as data exchanges occur, taking advantage of concurrent transmissions by the various sensor platforms 100.

Figure 7:
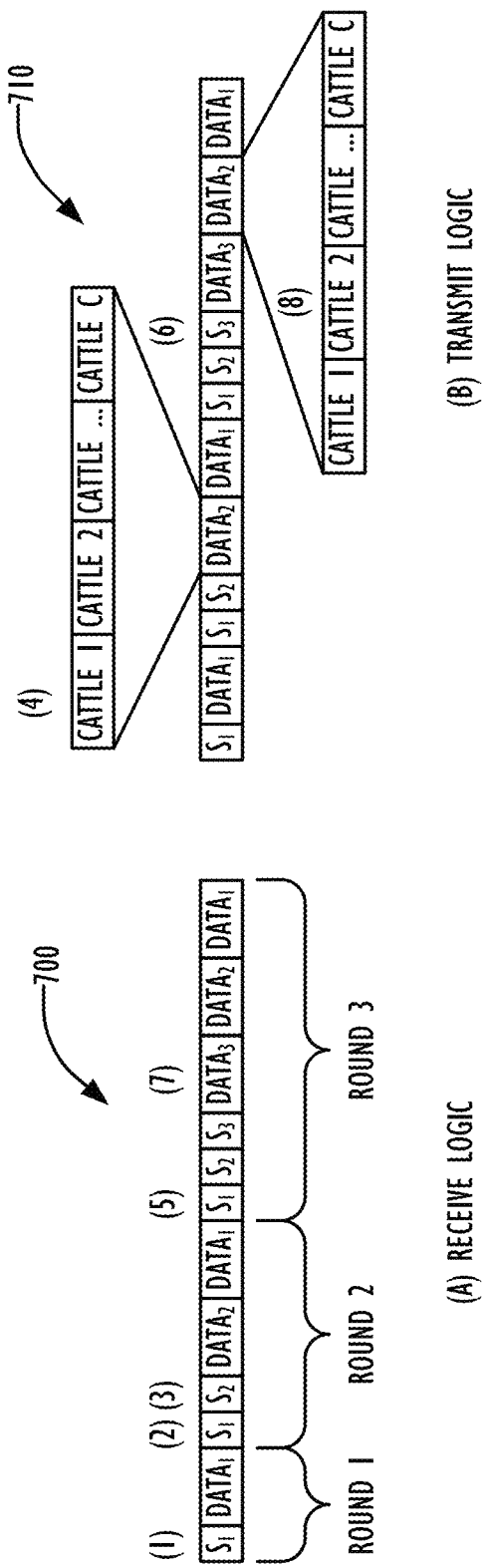
FIG. 7 is a block diagram illustrating an example sequence of transmit and receive actions according to one embodiment.

The behavior of the sensor protocol is described using the example sequence of events in views (a) and (b) of the block diagrams illustrated in FIG. 7, where view (a) shows behavior by the receiving portion (Receive logic) and (b) shows the behavior of the transmitting portion (Transmit logic) of a sensor platform 100. The various synch and data packets are annotated with numbers to indicate the time order in which the events occur. The following describes the actions taken by a typical sensor platform 100 in the mesh network and assumes that the sensor platform 100 is attached to Cattle 1 which is located 2 hops away from the base station 200.

1. The sensor platform 100 listens for synch packets until one is received. It listens in Round 1, designated as $S_1$, but no packet is received so it returns to sleep.

2. The sensor platform 100 awakens at the beginning of Round 2 and listens for a synch packet ($S_1$), but again no packet is received. It continues to listen for all synch packets in a given round before returning to sleep.

3. The sensor platform 100 receives a synch packet in the second time slot of Round 2, designated as $S_2$, which it received from another sensor platform 100 one hop away.

4. In response, the sensor platform 100 transmits a data packet containing its GPS and accelerometer data during the Cattle 1 time slot of $Data_2$ and then returns to sleep mode.

5. The sensor awakens at the beginning of Round 3 and receives another synch packet $S_2$. The bit-mapped response field 450 within the packet contains a 1 in the Cattle 1 field, which indicates that the base station 200 received the data packet. If the bit was not set, indicating a packet loss, the sensor platform 100 would re-transmit the Cattle 1 sensor data in the $Data_2$ slot. It also acts as a relay node because the round number is greater than the hop count. The sensor platform 100 deduces the procedure has not terminated because the bit-mapped fields are not all set to 1.

6. When acting as a relay, the sensor platform 100 broadcasts the synch packet during $S_{h+1}$. View (b) of FIG. 7 shows the sensor platform 100 re-broadcasting the synch packet during $S_3$.

7. The sensor platform 100 then listens for broadcasts from other sensor platforms 100 during $Data_{h+1}$ ($Data_3$ in this case) and will act as a relay if it receives any data.

8. If another sensor platform 100 transmits during $Data_3$, e.g., Cattle 2, it will broadcast this in $Data_2$, during Cattle 2's time slot, which will move the data from Cattle 2's sensor platform 100 one hop closer to the base station. Multiple cattle can engage in a (re)transmission operation simultaneously during any given time interval. This condition is referred to as a concurrent transmission which is acceptable because LoRa receivers lock onto the strongest signal.

9. The sensor platform 100 repeats this process until the synch packet indicates that the data collection process has completed, either because all bit-mapped fields are set to 1 or a stop condition has been met.

In general, the sensor platform 100 always listens for synch packets. It only listens for data packets with a hop count greater than the synch hop number. The sensor platform 100 only listens for data slots that the synch frame has not addressed, recording data packets that the base station 200 has not yet received and relaying them on toward the base station during the next round if the hop count is less than the current value. To minimize power usage, the sensor platform 100 may sleep when $h_{current} > h_{device}$ during a synch frame and $h_{current} < h_{device}$ during a data frame. For example, in the scenario illustrated in FIG. 3, a sensor platform 100 at hop 2 would listen to synch frames $S_1$ and $S_2$ in rounds 1-3, but not listen to synch frame $S_3$ in round 3. Similarly, the sensor platform 100 at hop 2 would sleep during data frames $Data_1$ and $Data_2$ in rounds 1-3 but would listen to frame $Data_3$ in round 3.

The sensor platform 100 transmits its own sensor data during its own time slot of the data packet and transmits other sensor data during other time slots. Multiple sensor platforms 100 may transmit concurrently. For example, in the scenario of FIG. 3, if the sensor platform 100 is associated with Cattle 1 at hop 2, the sensor platform 100 transmits its own data during the Cattle 1 time slot of the $Data_2$ packet in round 2, transmits a synch packet $S_2$ in round 3, and transmits data from Cattle 2 in the Cattle 2 slot of data packet $Data_2$ in round 3. This allows each sensor platform 100 to limit current usage by sleeping when it is not listening for or transmitting synch packets or data packets.

Analysis

Figure 8:
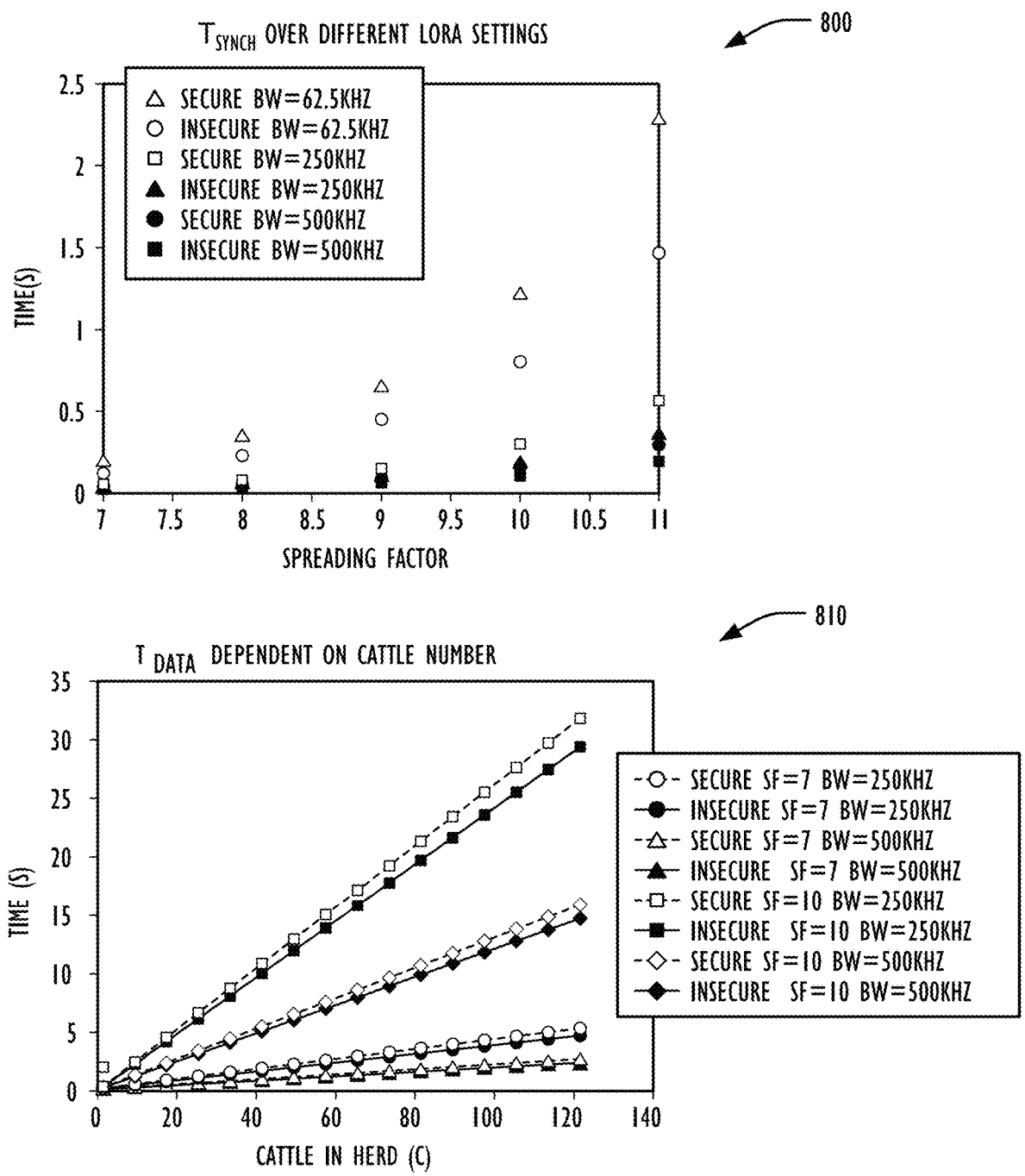
FIG. 8 is a pair of graphs illustrating transmission time for a synchronization packet over various LoRa settings and transmission time for a data window dependent on the number of nodes in the network, according to one embodiment.

Changes in LoRa settings cause an increase or decrease in the communication range with a corresponding penalty or benefit to transmission time. FIG. 8 comprises two graphs 800 and 810 that illustrate transmission times of synch and data packets according to one embodiment. Graph 800 plots the transmission time ($T_{Synch}$) as a function of the spreading factor (SF) and bandwidth (BW) to send an insecure and a secure synch packet, illustrating that the security extension is associated with a modest overhead increase over the use of insecure packets. As discussed earlier, the security extension adds to the length of the network packets and corresponding transmission time. Similarly, graph 810 illustrates the time for all C cattle to transmit one data packet ($T_{Data}$), as a function of herd size, C, under different LoRa settings, with and without the security extension.

The energy consumption for a sensor platform 100 to carry out the protocol operations over the time interval defined by a single event is given by Eq. 1 below, where h is the hop count, R is the total number of rounds, C is the total number of cattle in a herd, and n is the number of sensor platforms 100 with the same or fewer hop counts. Pt and Pr are the transmit and receive power respectively.

$$E_{device}(h, R, n) = \left(T_{synch}(R-h) + \frac{T_{data}(C-n)}{c}\right)P_t + \left(T_{synch}h\left(\frac{h+1}{2} + R - h\right) + T_{data}(R-h)\right)P_r \quad (1)$$

The best-case energy consumption scenario is defined by Eq. 2 below and occurs when all cattle sensor platforms 100 are within range of the base station.

$$E_{best} = T_{data}P_t + 2T_{synch}P_r \quad (2)$$

The worst-case energy consumption (Eq. 3) occurs for the sensor platform 100 closest to the base station, in an arrangement where all sensor platforms 100 are spaced equally in a straight line from the base station. Here, the base station must execute C rounds to collect the complete data set.

$$E_{worst} = C((T_{data} + T\text{synch})P_t + (T\text{synch} + (C-1)T_{data})P_r) \quad (3)$$

The total energy consumption for all sensor platform 100 nodes is defined as the sum of the individual consumption from all the cattle sensor platforms 100.

To evaluate the performance of our mesh topology, we created a simulation model with the cattle sensor platforms 100 distributed in a 1-dimensional space (1-D). Existing simulation tools, such as NS3, could not accurately model the energy consumption performance due to the different states that the sensor platforms 100 operate in. The performance in the 1-D distribution scenario represents the worst case even in an actual 2-dimensional (2-D) scenario. The following parameters are used in our analysis: average $P_t$=330 mW and $P_r$=15.9 mW, C=128, SF=9, BW=250 kHz, and error coding rate 1.25.

Figure 9:
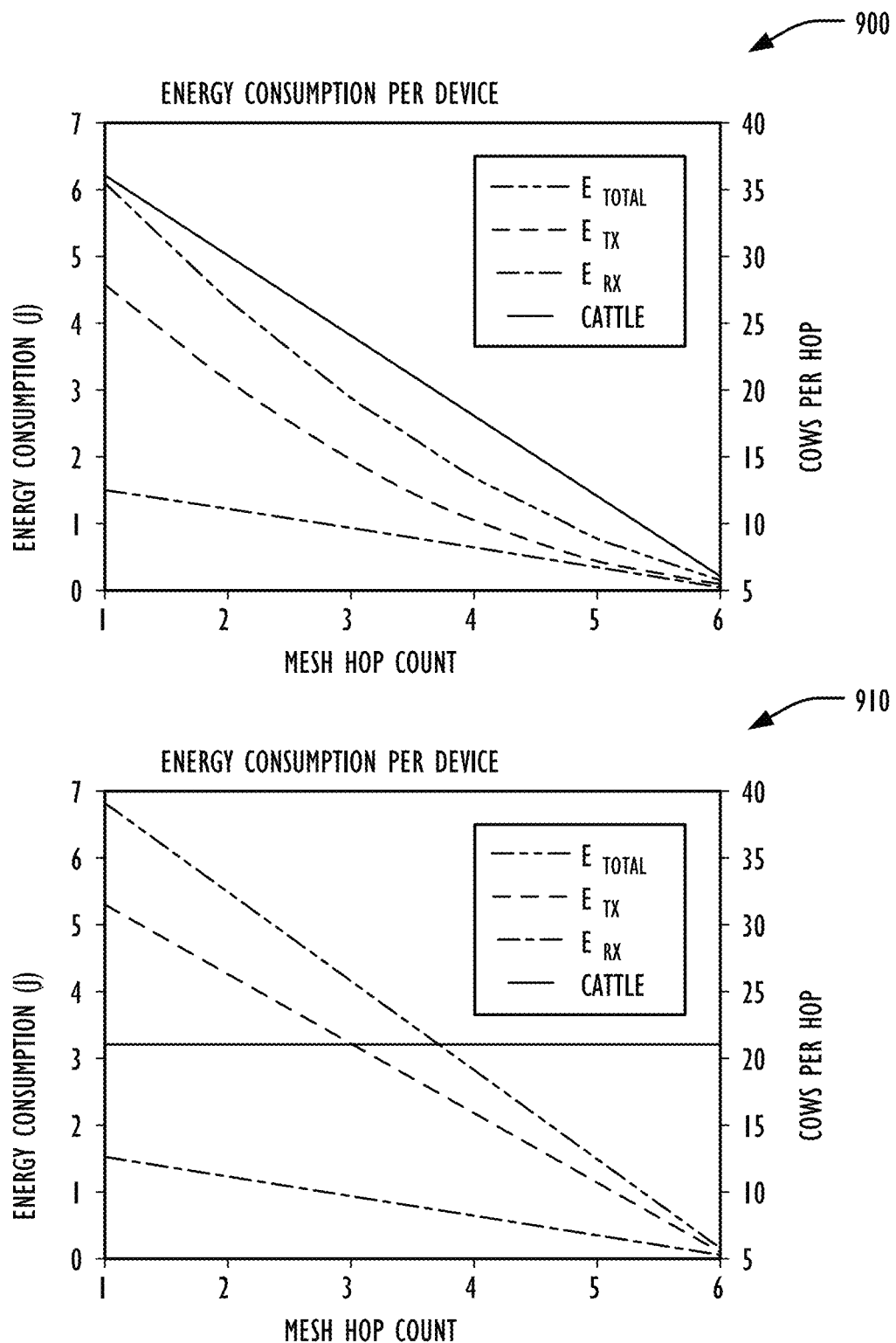
FIG. 9 is a pair of graphs illustrating energy consumption if the nodes or devices in the network have a linear distribution and energy consumption if the nodes have a uniform distribution, according to one embodiment.

We present the energy consumption for the linear distribution of cattle sensor platforms 100 in graph 900 of FIG. 9, where the number of cows per hop is indicated by the right axis. The transmit and receive energy is plotted as individual curves along with the total energy consumed per device at each hop in the mesh (x-axis). The sensor platforms 100 located closer to the base station 200 are tasked with relaying more data and therefore consume more energy. From the graph, the peak energy consumption for sensor platforms 100 located at the first hop is 6 J. This allows for approximately 450 mesh events before recharging is required, assuming a small 2.7 kJ (200 mAh) rechargeable lithium-ion battery is used. An alternative uniform distribution is shown in graph 910 where the sensor platforms 100 are distributed equally such that (C/R) cattle are located at every hop. The linear distribution more closely models a real-world cattle distribution. This is true because the base station 200 will typically be placed at the cattle's water source or other locations where cattle will frequent and cluster.

Figure 10:
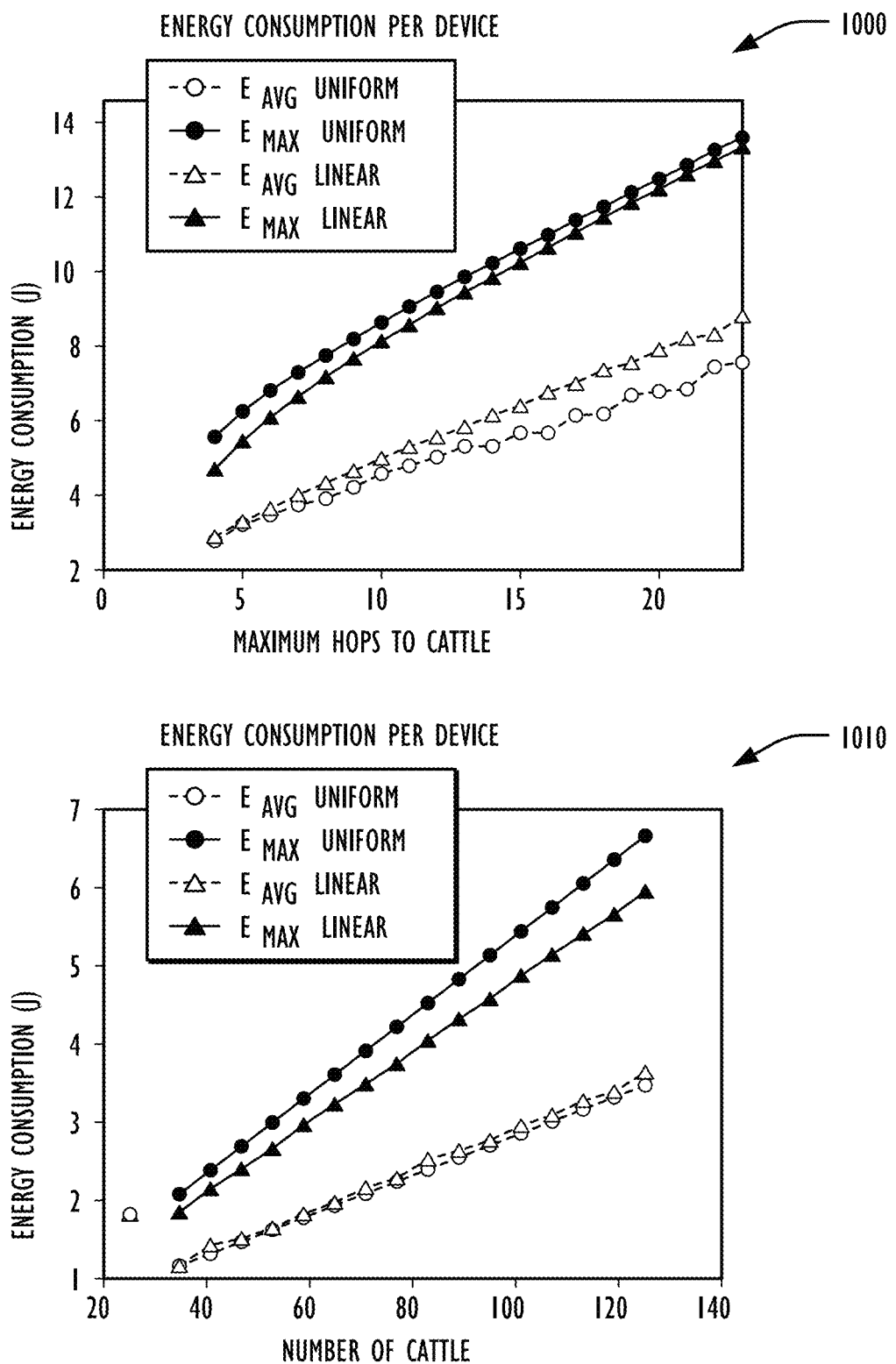
FIG. 10 is a pair of graphs illustrating energy consumption per device as a function of the number of hops and energy consumption for six hops as the number of nodes in the WMN, such as the cattle herd size, according to one embodiment.

We now assess how energy consumption scales as a function of herd size and spreading. FIG. 10 illustrates two graphs 1000 and 1010 showing energy consumption per sensor platform 100 versus the maximum hops to cattle and the number of cattle. Graph 1000 shows how the energy consumption scales as the maximum hop count increases. Here, we assume the size of the herd is fixed at 128 and examine increasingly wider distributions among the herd. The average and maximum power consumption of the sensor platform 100 is plotted under the linear and uniform distribution models. These results indicate that the relationship between energy consumption and hop count is linear, suggesting that a strategy that restricts maximum hop count could conserve energy, but introduces the risk that some sensor platforms 100 may be unable to communicate with the base station 200. Graph 1010 illustrates that the average and maximum energy consumption scales linearly with the size of the herd. The energy load on the sensor platforms 100 at the first hop, indicated by $E_{max}$, scales at a higher rate than the average consumption of the herd ($E_{avg}$).

Security

Two goals of a secure system are to ensure data privacy and to prevent false impersonation of sensor platforms 100. In one embodiment, a security extension to the cattle monitoring application utilizes two 128-bit keys including a shared sensor group or herd key $K_h$ and sensor or cattle-specific key $K_c$ for use in AES-based encryption and authentication operations. $K_c$ is unique to every sensor platform 100 while $K_h$ is common to the entire herd. The encryption keys may be installed during the manufacturing of the sensor platforms. We assume the base station 200 can securely communicate with a server to gain access to the keys. The use of 128-bit keys is by way of example and illustrative only, and other key lengths may be used as desired with corresponding changes in field sizes in the MAC fields 460 and 570 of the packets.

In one embodiment, AES-128 may be used to encrypt data using $K_c$ before transmission through the LoRa network. $K_c$ may be stored privately in a non-volatile memory on each sensor platform 100 preventing intermediate sensor platform 100 nodes from decrypting data that they relay to the base station 200. In one embodiment, the encrypted cattle data field 570 of the encrypted data packet format 510 may include a 4-byte timestamp which serves as a message authentication code (MAC) to enable the base station 200 to detect malicious modifications to the transmitted data. The MAC prevents malicious actors from carrying out spoofing attacks by making it nearly impossible for them to create valid encrypted data packets. The use of AES-128 is by way of example only and illustrative only and other encryption techniques may be used as desired.

The synch packet may also be authenticated with the MAC field 470 using $K_h$. Thus, every sensor platform 100 in the network can validate the authenticity of the fields in the synch packet and data packets. This prevents a simple DoS attack where a malicious actor broadcasts a fake synch packet indicating the base station 200 has received data from all sensor platforms 100, which in turn triggers all sensor platforms 100 to enter sleep mode until the next event. The 4-byte time stamp makes the MAC unique over successive authentication operations, thus preventing replay attacks where adversaries capture and attempt to reuse previously transmitted MACs.

Encryption prevents malicious actors from eavesdropping on specific sensor data transmissions if they do not possess the sensor platform 100's encryption key. However, an adversary can apply invasive techniques or side-channel analysis methods to extract sensor-specific keys, using techniques such as are described in Skorobogatov, S., "Flash memory 'bumping' attacks" (International Workshop on Cryptographic Hardware and Embedded Systems, Springer (2010) 158-172), and Zhou, Y., Feng, D., "Side-channel attacks: Ten years after its publication and the impacts on cryptographic module security testing" (IACR Cryptology ePrint Archive 2005(388) (2005)). If an adversary can extract $K_h$ and $K_c$ using such methods, they might be able to create valid data packets and impersonate the base station 200. However, because $K_c$ is unique to each sensor, they would be unable to impersonate sensor platforms 100 from other cattle.

If a sensor goes entirely offline because the cow or its sensor platform 100 moves out of range (for example, in the case of theft), a key update operation may be used to maintain security within the network. The ability to periodically update sensor keys will prevent adversaries who engage in key extraction attacks from compromising network security. Secure re-keying involves selectively updating $K_h$ on every sensor, such as when a sensor platform 100 has been compromised, possibly allowing an adversary access to the herd key $K_h$. Distributing a new $K_h$ may be accomplished by sending a packet encrypted by the base station with $K_c$ or another cattle specific encryption key $K_r$ to each device. The key update process may employ a distinct packet format and message exchange protocol beyond those defined above. In such a system, the third encryption key $K_r$, which is known only by a server, is used by the server to sign an update to the herd key $K_h$. Thus, the new herd key $K_h$ is never exposed even if an adversary knows all three keys of a malicious device. In addition to updating keys securely, the software on the sensor platforms 100 may be updated using a similar procedure and encryption keys.

Firmware Update Techniques

Our techniques are designed to optimize the remote firmware update time but they are relevant for any large data exchange between networked wireless devices. From Table 1, firmware updates of a 128 kB image using LoRa vary from 16 minutes to 8.36 hours depending on the SF selected. The 128 kB firmware image requires 2,000 data transfers with a 64-byte data packet size. Table 1 shows that this firmware update process takes an unacceptably long time at SF=12, takes a reasonable amount of time at SF=6, and is fastest when using FSK. The times reported are based on the following assumptions: 1) no packet transmission errors occur, 2) the bandwidth is 125 kHz, 3) a 12-symbol preamble is used, 4) CRC is enabled, 5) an implicit header is used, and 6) the error coding rate is 4/5. Update times are shorter as SF is reduced, making them more attractive, but the communication range is also reduced. Therefore, the ADR optimization process should target the lowest SF that provides an acceptable communication bit error rate. Some LoRa integrated circuits (ICs), such as the SX1276 from Semtech Corporation can be configured to use frequency shift keying (FSK) which has higher data rates at the expense of less range. We have extended ADR to use FSK mode when there is appropriate signal strength, which, in turn, improves data rates as shown along the bottom of Table 1.

TABLE 1

The Nominal Time It Takes To Update a 128 kB Firmware Image

| | Time to Update Firmware for a 128 kB image | | | |
|---|---|---|---|---|
| LORA SF | 6 | 8 | 10 | 12 |
| Time | 16 minutes | 40 minutes | 2.49 hours | 8.36 hours |
| FSK (bps) | 19,200 | 57600 | 115,200 | 300,000 |
| Time | 53.3 s | 17.7 s | 8.88 s | 3.41 s |

In the discussion below, we extend ADR to use FSK in addition to optimizing LoRa settings. An error recovery process is described that addresses the possibility that two devices can reside on different settings if there is a communication error. LoRaWAN gateways avoid this issue because they receive packets from all LoRa SF settings simultaneously. In addition, dynamic timeouts and acknowledgments that depend on the communication settings are incorporated that have not been investigated in previous LoRa ADR work. Our ADR techniques have been simulated and verified experimentally, going beyond most previous work that provides only simulation results.

In addition to the challenges associated with ADR, reliability and security considerations add complexity to the firmware update process. If a firmware update is not completed properly, the device is likely to become inoperable. Since free-ranging cattle can travel long distances, they may roam outside of the operational communication range of the base station, increasing the risk of an incomplete firmware image transfer. In addition, the device's low-capacity battery may not be able to provide the power required to complete the firmware update process, resulting in an incomplete transfer. The security of the update process is also a concern since a malicious actor could try to hijack the firmware during the update process, which could allow them to access data stored on the device, including the proprietary embedded algorithms. A malicious actor could also subvert the devices using a Denial of Service (DoS) attack by loading code into the devices that is not functional. We address those concerns by providing techniques that ensure reliability and security while using ADR to complete the process as efficiently as possible.

We provide below a detailed background of LoRa, LoRaWAN, and related research, to present the state of the art and to explain our reasoning for not using LoRaWAN, prompting our development of the custom mesh networking approach described herein. We then discuss our experimental validation of the LoRa transmit time model. We then discuss ADR techniques in detail and present modeling results. We then proceed to experimental validation of the ADR techniques before providing our conclusions.

LoRa Physical Layer (PHY)

The LoRa PHY has many configurable parameters including SF, error coding rates, header types, preamble length, and bandwidth. SF is the number of chirps per meaningful symbol of information. The number of chirps improves the noise tolerance of the system but decreases the communication rate and can be configured to a value in the range of 64 to 4096. The error coding rate is the number of redundant bits transferred to allow for error correction and is configurable to include between 25% to 100% extra symbols. There is also an optional header that can be used to transmit the packet size and error coding rate before the data payload. For applications where this value is fixed, the header can be omitted to improve efficiency. The preamble length is used for synchronization between the transmitter and receiver and can be set to a value between 6 and 65535 symbols. The bandwidth can be decreased to increase noise immunity at the expense of the data rate.

LoRaWAN is a network layer that uses the LoRa PHY to transmit data. It is defined as a standard for interfacing to a LoRaWAN gateway. There are three methods of operation using LoRaWAN and they trade off performance for power consumption. Class A is the lowest power operation, and all communication is initiated by the end device. There are two short windows within which the end device can receive data after it transmits if the gateway needs to respond. Class B is like class A except it periodically opens receive windows for data reception. Class C is the highest power consumption mode because the end device is always able to receive data. None of these LoRaWAN options are optimal for networking unattended mobile sensor platforms, so instead, we use a custom networking layer with the LoRa PHY.

There have been a significant number of recent papers on LoRa and LoRaWAN due to their promising range and power performance. For example, the authors of M. Bor, U. Roedig, "Lora transmission parameter selection" (13th International Conference on Distributed Computing in Sensor Systems (DCOSS), pp. 27-34, June 2017) provided a broad analysis on LoRa parameter selection, while the authors of M. C. Bor, U. Roedig, T. Voigt, J. M. Alonso, "Do LoRa Low-Power Wide-Area Networks Scale?" (MSWiM, 2016) investigated the scalability of LoRaWAN. An energy consumption model for different transmit parameters was developed and analyzed in T. Bouguera, J.-F. Diouris, J. J. Chaillout, R. Jaouadi, and G. Andrieux, "Energy Consumption Model for Sensor Nodes Based on LoRa and LoRaWAN" (Sensors, vol. 18, no. 7, p. 2104, June 2018). The energy consumption of LoRaWAN was modeled for battery-powered applications in L. Casals, B. Mir, R. Vidal, and C. Gomez, "Modeling the Energy Performance of LoRaWAN" (Sensors, vol. 17, no. 10, p. 2364, October 2017). There have been a variety of publications on applications that demonstrate performance improvements enabled by LoRa. See, for example, V. Sharma, I. You, G. Pau, M. Collotta, J. Lim, and J. Kim, "LoRaWAN-Based Energy-Efficient Surveillance by Drones for Intelligent Transportation Systems" (Energies, vol. 11, no. 3, p. 573, March 2018); L. Germani, V. Mecarelli, G. Baruffa, L. Rugini, and F. Frescura, "An IoT Architecture for Continuous Livestock Monitoring Using LoRa LPWAN" (Electronics, vol. 8, no. 12, p. 1435, December 2019); and R. P. Centelles, F. Freitag, R. Meseguer, L. Navarro, S. F. Ochoa, and R. M. Santos, "A LoRa-Based Communication System for Coordinated Response in an Earthquake Aftermath" (Proceedings, vol. 31, no. 1, p. 73, November 2019).

Most of the previous work on LoRa rate adaptation focuses on minimizing bit errors for a congested IoT environment using LoRaWAN. The authors of M. Slabicki, G. Premsankar, M. D. Francesco, "Adaptive configuration of lora networks for dense IoT deployments" (IEEE/IFIP Network Operations and Management Symposium (NOMS), pp. 1-9, April 2018) developed a simulation framework and proposed an optimized ADR technique with LoRaWAN gateways. In S. Kim and Y. Yoo, "Contention-Aware Adaptive Data Rate for Throughput Optimization in LoRaWAN" (Sensors, vol. 18, no. 6, p. 1716, May 2018) and K. Abdelfadeel, V. Cionca, D. Pesch, "Fair Adaptive Data Rate Allocation and Power Control in LoRaWAN" (2018 IEEE World of Wireless Mobile and Multimedia Networks (WoW-MoM), June 2018), the emphasis was on implementing ADR to minimize collision probability and on maximizing data rates in congested networks. A probing algorithm to negotiate parameters that minimize bit errors and energy consumption for LoRaWAN gateways was proposed in the Bor article cited above. The authors of S. Li, U. Raza, A. Khan, "How Agile is the Adaptive Data Rate Mechanism of LoRaWAN?" (2018 IEEE Global Communications Conference (GLOBECOM), pp. 206-212, 2018) investigated LoRaWAN's ADR convergence time and propose optimization techniques for some of the tuning parameters. It has been shown that LoRaWAN's ADR performs well for stationary objects but can be improved for mobile devices. See K. Kousias, G. Caso, O. Alay, F. Lemic, "Empirical Analysis of LoRaWAN Adaptive Data Rate for Mobile Internet of Things Applications" (2019 MobiCom, October 2019). In V. Hauser, T. Hegr, "Proposal of Adaptive Data Rate Algorithm for LoRaWAN-based Infrastructure" (2017 IEEE 5th International Conference on Future Internet of Things and Cloud, 2017), the authors showed that adding hysteresis to the current LoRaWAN ADR protocol can improve it.

LoRa Transmit Time Model

We have focused on optimizing the total transmit time, which in turn reduces power consumption, so it is important to utilize accurate packet transmission time models to properly evaluate the adaptive rate techniques. This section uses the model described in Semtech, "SX1276/77/78/79-137 MHz to 1020 MHz Low Power Long Range Transceiver" (SX1276/77/78/79 datasheet, August 2016) and compares the modeling results to experimentally measured values.

Equations Used in Time Modeling

The transmit time can be partitioned into preamble and payload transmission times. The preamble time is defined by Eq. 4 where $N_{preamble}$ is the number of preamble symbols.

$$T_{preamble} = (N_{preamble} + 4.25)T_s \qquad (4)$$

The payload time may be defined by multiplying the number of payload bytes by the symbol time as shown in Eq. 5.

$$T_{payload} = n_{payload} T_s. \qquad (5)$$

The symbol time may be found by using the spreading factor and bandwidth as shown in Eq. 6.

$$Ts = \frac{2^{SF}}{BW} \qquad (6)$$

The number of bytes in a payload is found using Eq. 7 (a full definition of this expression can be found in the Semtech datasheet cited above). $n_{payload}$ cannot be less than 8.

$$n_{payload} = 8 + \text{ceil}\left[\frac{8PL - 4SF + 28 + 16CRC - 20IH}{4(SF - 2DE)}\right](CR + 4) \qquad (7)$$

Experimental Test

Figure 11:
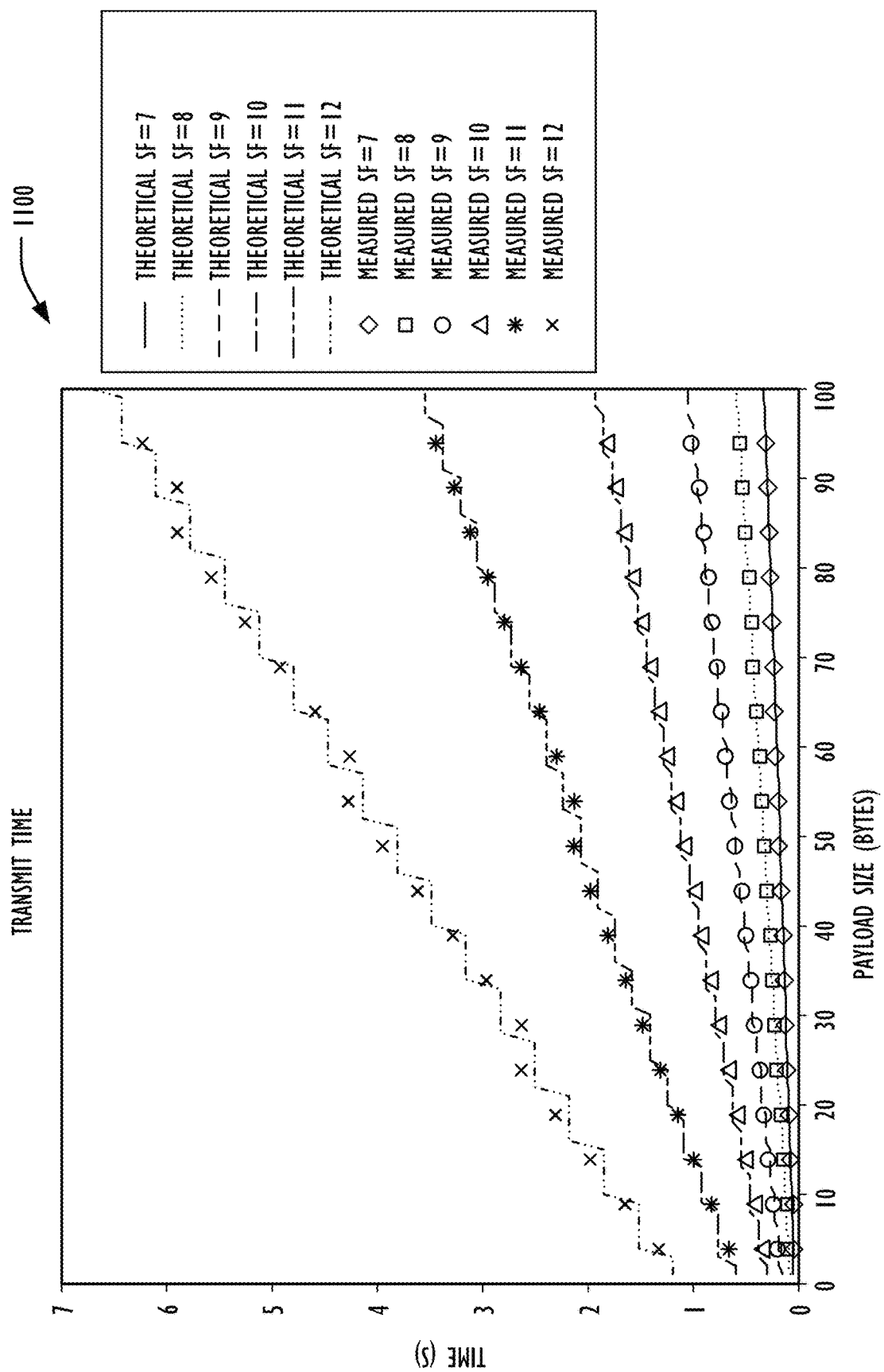
FIG. 11 is a graph illustrating an experimental validation of transmit time calculations as a function of payload size.

The accuracy of these equations is important for understanding the error bounds of our modeling, so the timing was experimentally measured using a SAMR34 Xplained board from Microchip Technology Inc. An automated test was generated to loop through a variety of packet transmission parameters. A timer in the microcontroller was started before each packet transmission and was then terminated with an interrupt generated upon successful completion of the packet transmission. The results of the analytical and measured times are illustrated in graph 1100 of FIG. 11. The x-axis varies the payload size in bytes while the y-axis shows the transmit time in seconds. The curve lines indicate the modeled time and the symbols indicate the measured time. The error for all packet transmissions remains under 3% for all messages with a payload over 50 bytes but increases to 13% for 4-byte packet transmissions. This demonstrates that the payload length parameter is accurately modeled by Eq. 7, but the error is larger for the packet header, preamble, and CRC. We acknowledge that our measurement scheme is not ideal and includes two sources of error; namely in the oscillator tolerance and in the additional clock cycles required for starting and stopping the timer. The specific oscillator tolerance is 3% and the timer processing adds less than 10 clock cycles (~40 us).

This experiment was repeated using several LoRa configuration options and the results were found to be similar. In one case, we included the message header and in a second experiment, we modified the preamble length. Although the error is undesirable, the experimental results provide sufficient accuracy to define the error bounds for the ADR negotiation modeling described below.

Adaptive Data Rate Techniques
Technique Overview

We built an ADR LoRa network with two devices and investigate a dedicated exchange scenario to determine the optimal rate. The device that already has the firmware update in memory is referred to as the master and the device receiving the update is referred to as the end device (ED). This is an ad hoc network, so both devices are energy-constrained and the devices are limited to receiving on a single channel, unlike a LoRaWAN gateway.

We focused on optimizing the parameters that have the largest impact, namely the LoRa SF and FSK bit rates. Further optimization may be achieved by varying the bandwidth and coding rates. The goal of this work was to define an algorithm that minimizes the amount of time required to converge to the optimal rate given a set of constraints on the possible settings. However, the investigated techniques are valid when the number of settings is expanded for cases in which the application can benefit from the increased resolution. The settings used for this experiment are given in Table 2 below.

TABLE 2

The Settings and Timeout Values
ADR Settings and Timeouts

| Setting Number | Modulation Type | Setting Config | Master Timeout | ED Timeout |
|---|---|---|---|---|
| 0 | FSK | 300 kbps | 0.1 s | 0.4 s |
| 1 | FSK | 200 kbps | 0.1 s | 0.4 s |
| 2 | FSK | 115.2 kbps | 0.1 s | 0.4 s |
| 3 | FSK | 57.6 kbps | 0.1 s | 0.4 s |
| 4 | FSK | 19.2 kbps | 0.1 s | 0.4 s |
| 5 | FSK | 9.6 kbps | 0.1 s | 0.4 s |
| 6 | LoRa | SF = 6 | 0.1 s | 0.4 s |
| 7 | LoRa | SF = 7 | 0.2 s | 0.8 s |
| 8 | LoRa | SF = 8 | 0.25 s | 1 s |
| 9 | LoRa | SF = 9 | 0.4 s | 1.6 s |
| 10 | LoRa | SF = 10 | 0.7 s | 2.8 s |
| 11 | LoRa | SF = 11 | 1 s | 4 s |
| 12 | LoRa | SF = 12 | 3 s | 12 s |

We implemented our communication testing protocol with the following 6 commands:
1. Go to ADR mode
2. Decrease data rate one setting
3. Go to a specific setting
4. Exit ADR
5. Ping
6. Acknowledge receipt of a packet.

Figure 12:
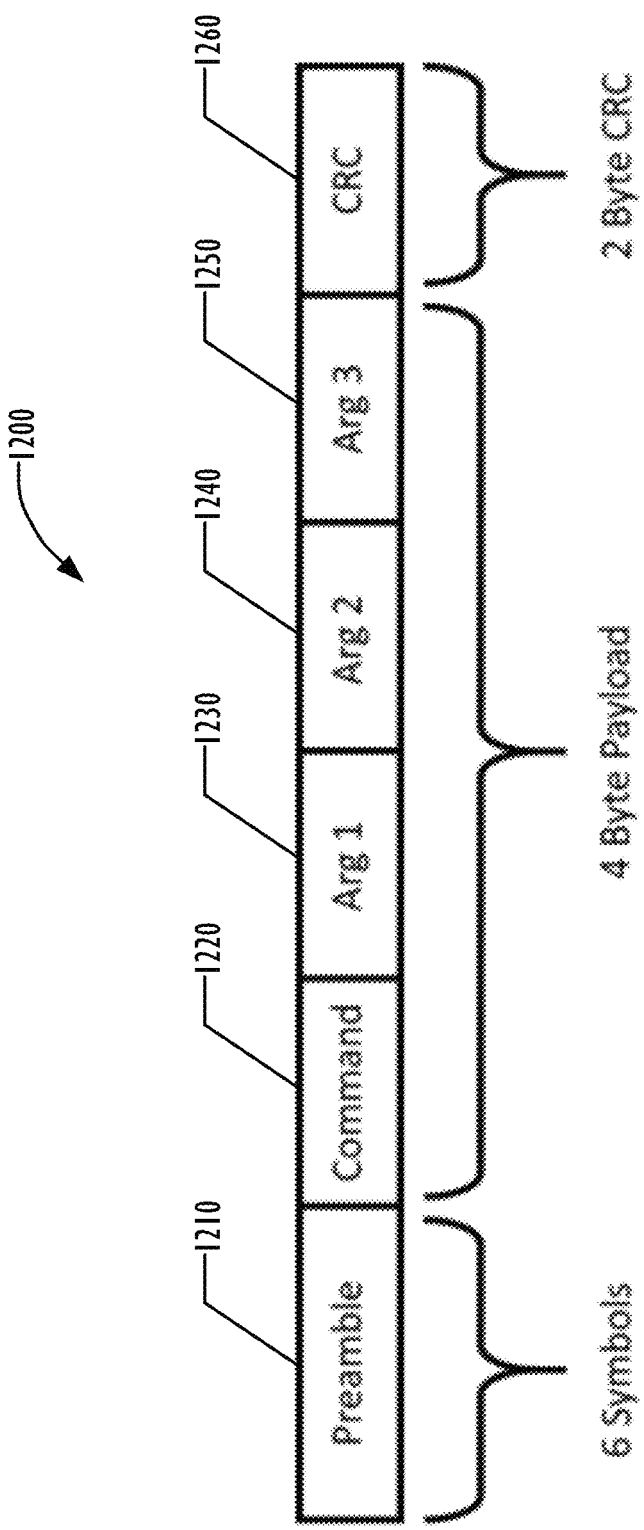
FIG. 12 is a block diagram of a communication packet structure according to one embodiment.

Commands have the format illustrated in the block diagram 1200 of FIG. 12, which consists of a preamble 1210, a command 1220, 3 arguments 1230-1250, and a CRC 1260.

All tested algorithms carry out the following sequence of steps:
1. Initiate an exchange on the lowest data rate setting to establish communication.
2. The master device sends the command to the ED to go to an improved data rate setting. The value of this setting depends on the algorithm being used.
3. Upon receiving the command, the ED will automatically reconfigure itself to that setting and acknowledge at the higher data rate.
4. If the devices are unable to communicate at a lower setting, the master will initiate the error recovery process.
5. If both devices time out, they return to the setting they last successfully communicated on.

A feature of these techniques is the use of dynamic timeout values to minimize time spent waiting for a response during an unsuccessful packet transmission. The timeout values are given for each setting in Table 2 above. The timeout values account for the transmit time, processor execution time, and the waiting time for the SX1276 RF module to change modes. If an acknowledgment is not received by the specified timeout, the master makes three additional attempts before giving up. It then pings the device at the faster setting to see if an acknowledgment message was missed. If all four of these attempts fail, it tries to communicate on a setting with a slower data rate (higher setting).

Incremental Search

An incremental search algorithm may be used to find the lowest setting that enables communication. Incremental search is the simplest technique to implement but can cause longer convergence times. This technique starts with LoRa setting 12 to establish communications and then incrementally decreases the setting until the communications are lost. Upon failure, the master tries the error recovery process. The algorithm terminates when the setting reaches 0 or the error recovery process fails.

Figure 13:
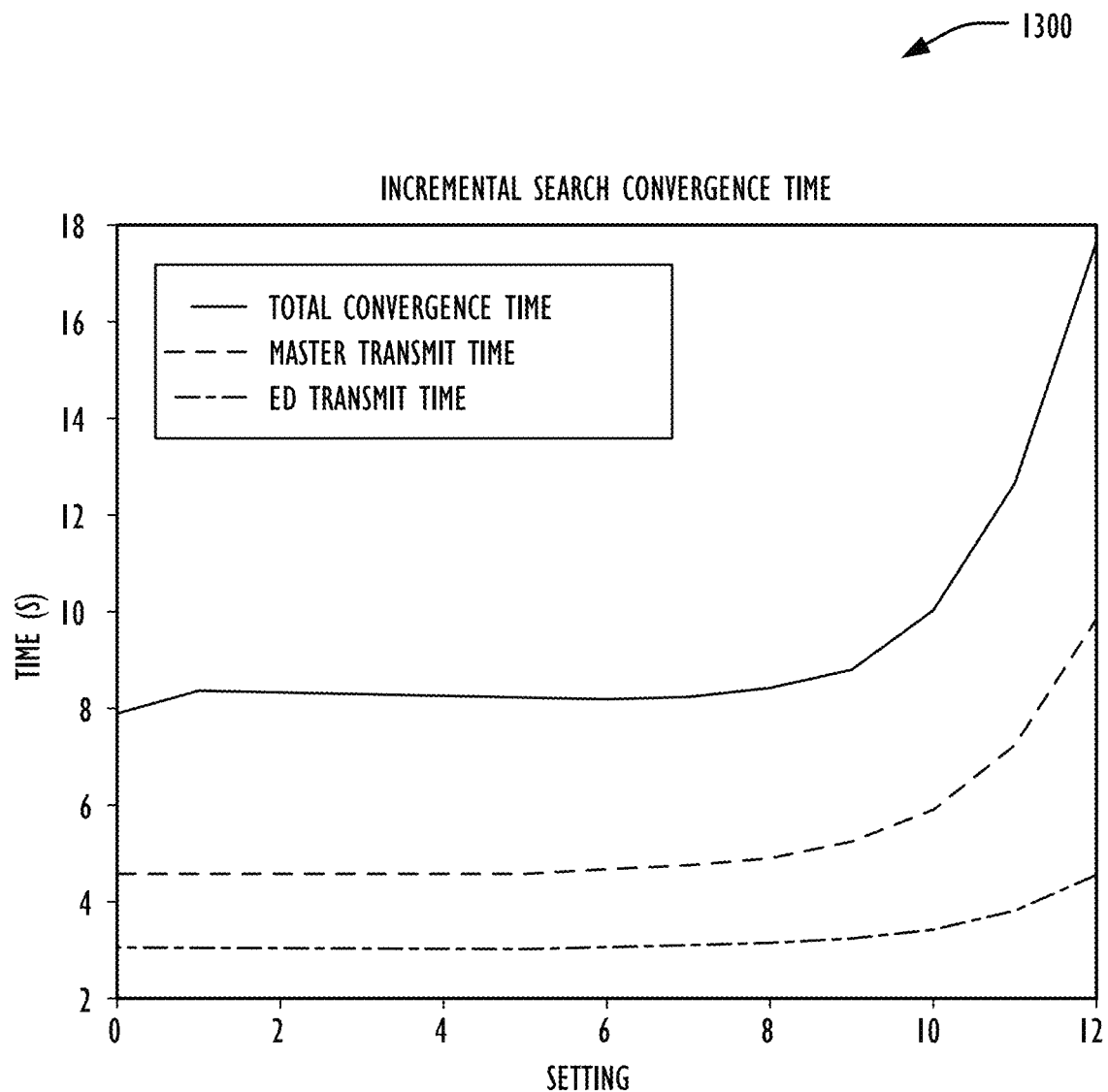
FIG. 13 is a graph illustrating convergence time for an incremental search between a master device and an end device (ED) according to one embodiment.

The estimated incremental search convergence time for each setting is shown in graph 1300 illustrated in FIG. 13. The x-axis gives the setting that the device is converging to while the y-axis gives the time. For example, the total convergence time to setting 4 (FSK, 19.2 kbps) is just over 8 seconds. The plot is initially counterintuitive because converging to the higher settings has the slowest convergence times despite having the fewest number of packets exchanged. This is because the error recovery process executes at the slowest communication rates. The sum of the master and ED transmit times does not equal the total time because there are timeouts and processing delays involved with the packet transmissions. Moreover, the transmit and convergence times do not account for any unexpected packet communication errors so these results represent the best-case convergence times.

Figure 14:
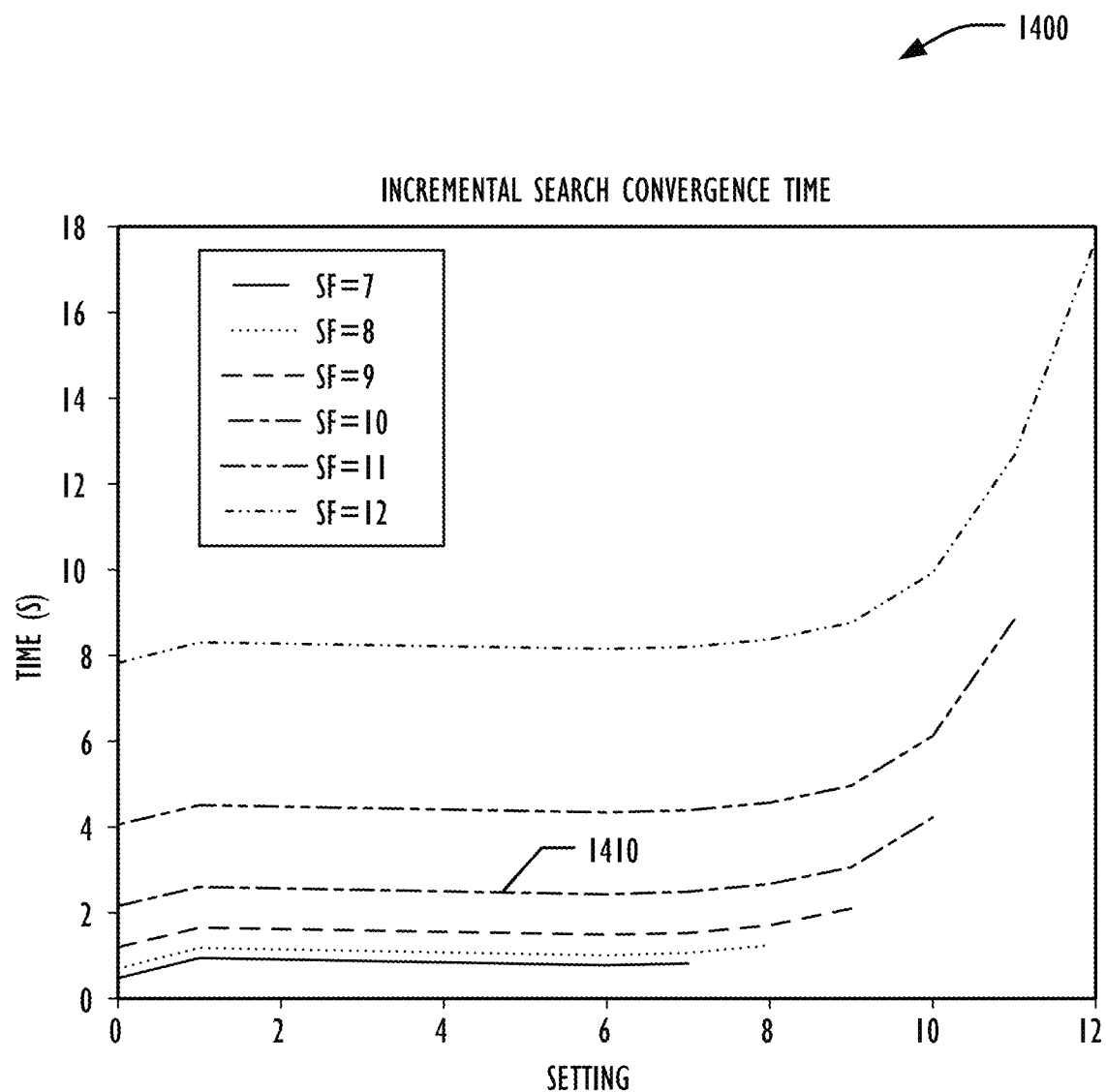
FIG. 14 is a graph illustrating the effect on convergence time for the incremental search between the master device and the ED, starting at different LoRa spreading factor settings.

Some applications do not require the range that setting 12 provides, so it could be advantageous to start at a lower setting. Graph 1400 illustrated in FIG. 14 depicts the convergence time assuming the algorithm starts at a lower setting. For example, plot 1410 illustrates the convergence times to switch to any of the lower settings if the algorithm begins with setting 10. The overall time savings between starting with settings 11 and 12 is substantial; however, decreasing the starting setting below 11 has diminishing returns. The danger associated with starting with a low setting is that successful communication may never be achieved.

These results show that incremental search is effective at quickly finding the minimum rate for higher settings but is time-consuming for the lower FSK settings. This is because every setting involving LoRa is used before it reaches the FSK modes. In the description below, we describe techniques that pass through the higher settings more efficiently.

Binary Search

A binary search algorithm may be used as an alternative strategy to reduce the convergence time for the lower settings. The binary search process chooses the next setting after a successful iteration using Eq. 8. The $S_{current}$ variable is the current communication setting, and $S_{highest,failed}$ is the highest setting the algorithm has failed at and is initialized to a value of 0.

$$S_{next} = S_{current} - \operatorname{ceil}\left(\frac{S_{current} - S_{highest,failed}}{2}\right) \quad (8)$$

Figure 15:
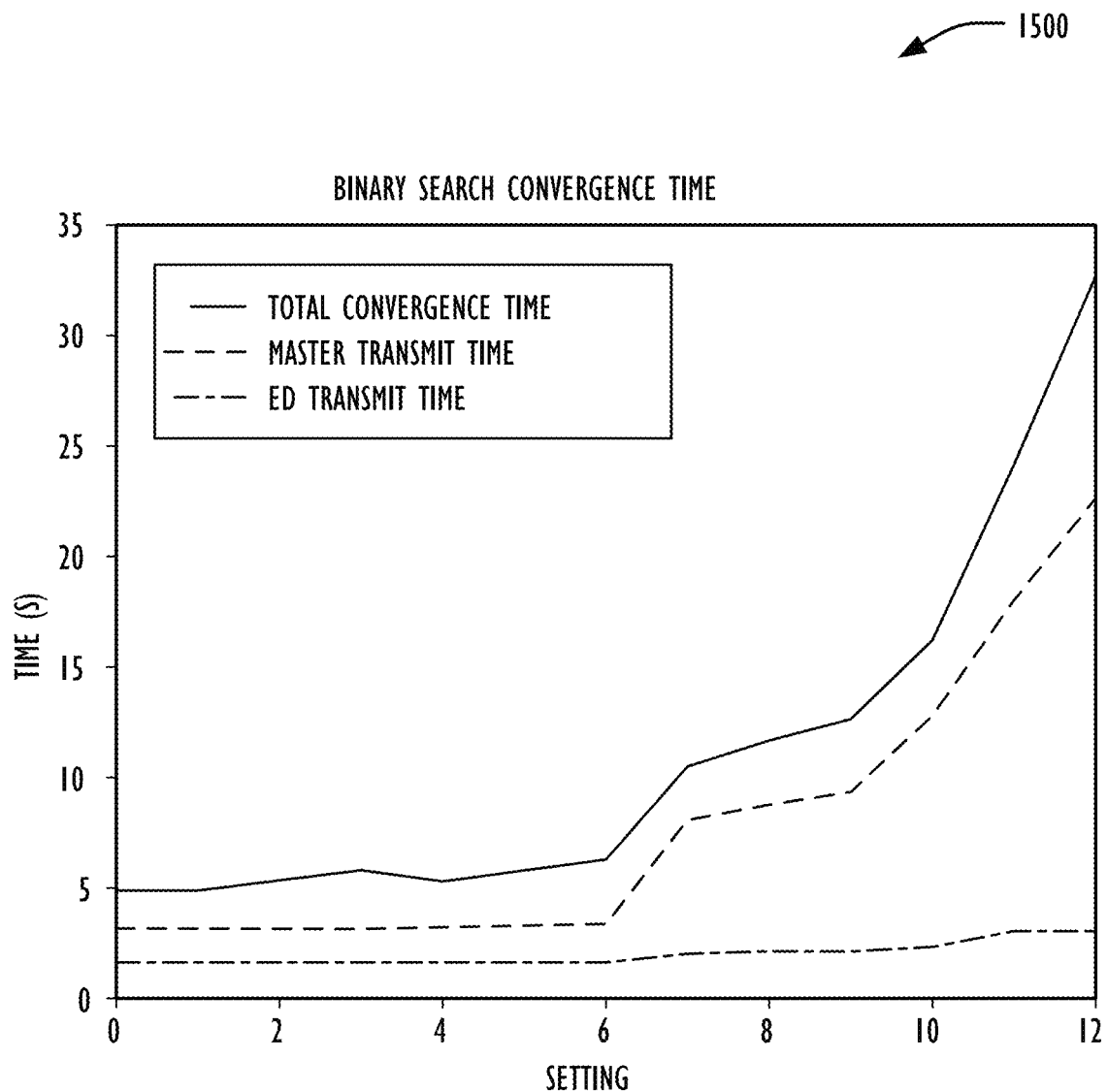
FIG. 15 is a graph illustrating the convergence time for a binary search between the master device and the ED according to one embodiment.

The binary search convergence time is depicted in graph 1500 illustrated in FIG. 15. The x-axis gives the setting number and the y-axis shows the convergence time. The total time assumes there are no communication errors until the attempted setting is lower than the optimal setting. Converging to settings 0 through 6 is faster with this technique because there is only a single exchange at the highest setting. The primary issue with the binary search algorithm is that it can go through the communication failure process multiple times. For example, converging to setting 12 causes four failures to occur with significant timeout periods resulting in the largest convergence time as shown in the figure.

Figure 16:
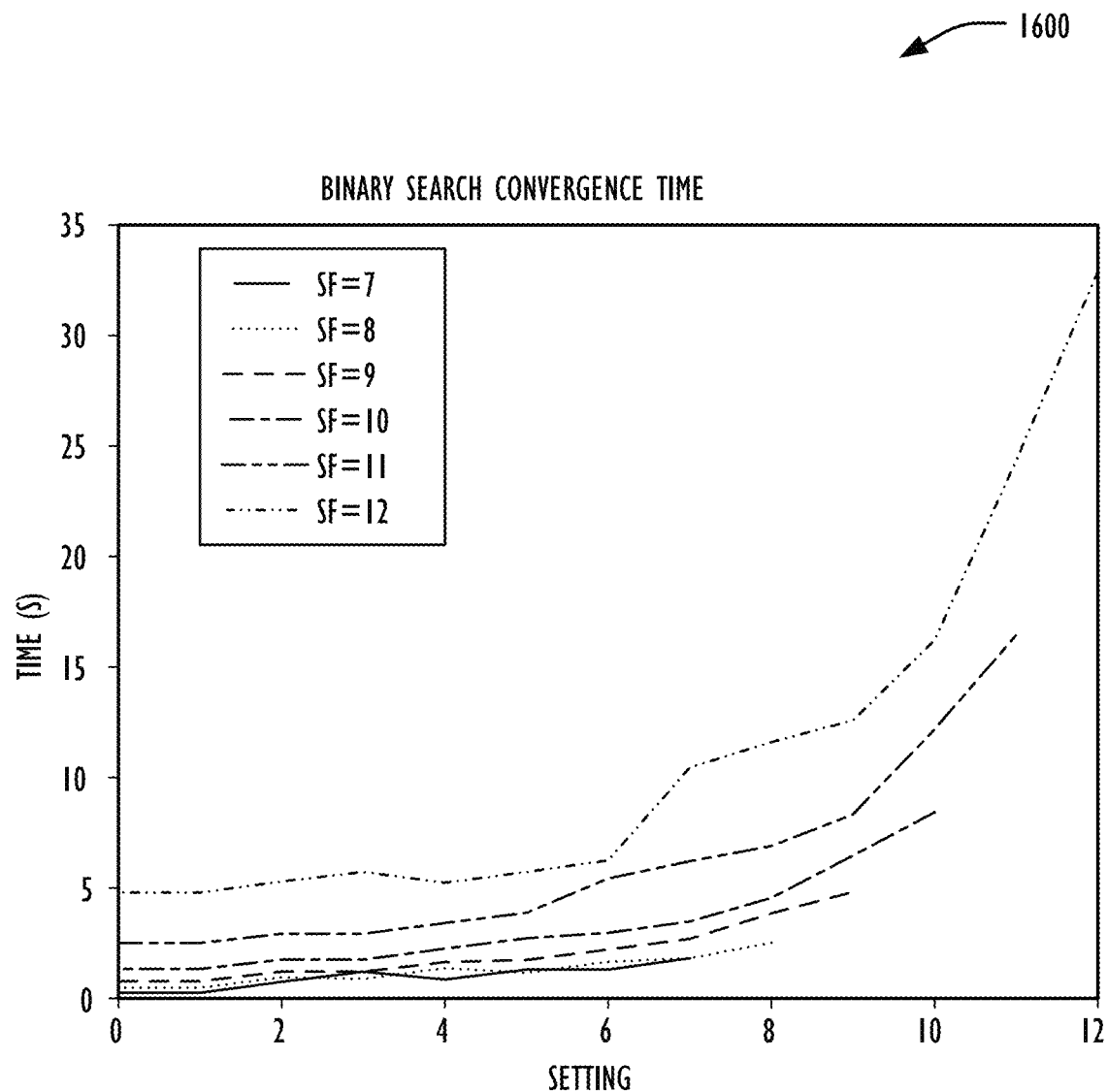
FIG. 16 is a graph illustrating the effect on convergence time for the binary search between the master device and the ED, starting at different LoRa spreading factor settings.

We then investigated the impact of the starting search setting on the convergence time, and the results are shown in graph 1600 illustrated in FIG. 16. The starting setting has a greater impact on the binary search than the incremental search.

The binary search is superior to the incremental search in cases where the devices are in close proximity to each other causing the search to converge to lower settings. However, the performance is poor for high settings, making the incremental search superior in cases involving long-range communication.

Greedy Search Using RSSI and SNR

A greedy search algorithm may be used to improve the search performance. The greedy search uses RF receiver data to intelligently judge the next appropriate setting. This can be the received signal strength indicator (RSSI) and the signal-to-noise ratio (SNR). In theory, this is the optimal technique because it converges after a few short exchanges.

One embodiment of the greedy search using RSSI establishes communications at the worst-case setting (setting 12) and then uses the RSSI level to intelligently select the best $S_{next}$. The RSSI is automatically measured by LoRa ICs when they receive a valid packet so this process does not require special hardware.

$S_{next}$ is computed in Eq. 9 and is derived from sensitivity specifications of FSK and LoRa (with BW=125 kHz). RSSI is measured in dBm and is calibrated by reducing the measured value by the error tolerance. The hardware measurement error tolerance is 2-6 dBm depending on the amount of averaging used. This technique avoids the iterations involved in incremental and binary search methods but requires more communications at setting 12 to achieve a reliable RSSI value.

The simulation models were configured with the following parameters: 1) bandwidth set to 125 kHz, 2) 12-symbol preamble, 3) CRC enabled, 4) implicit header enabled, and 5) error coding rate set to 5/4. The transmitted commands used to find the optimal ADR settings possess a 4-byte payload. The available commands to change settings are given as follows: 1) Go to ADR mode, 2) Go to setting, 3) Exit ADR, 4) Ping, and 5) Acknowledgment (Ack) or No Acknowledgement (Nack).

$$S_{next} = \operatorname{ceil}(-0.0002 RSSI^3 - 0.0751 RSSI^2 - 8.7614 RSSI - 343.76) \quad (9)$$

The binary search is most efficient when converging to lower settings but struggles at the higher settings. This is true because the device must fail more often at the higher settings to converge there. The incremental search is more efficient when a higher setting is required because it only fails once but is slower to converge to a lower setting because it must communicate on every setting. The greedy RSSI search is most efficient because the search process is eliminated. However, the additional overhead of obtaining an accurate RSSI value reduces its performance.

Figure 17:
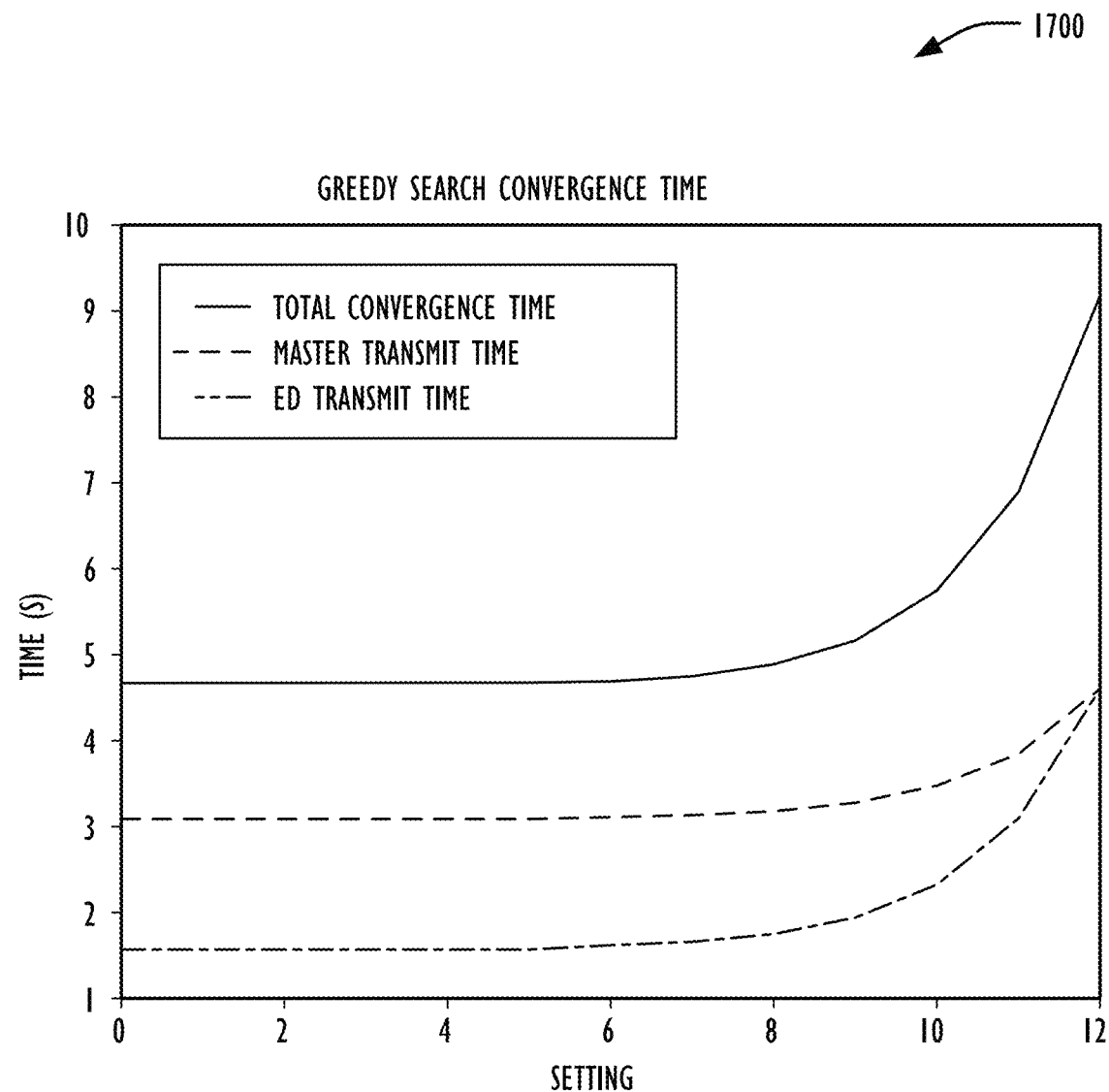
FIG. 17 is a graph illustrating the convergence time for a greedy search between the master device and the ED according to one embodiment.

FIG. 17 is a graph 1700 illustrating the ideal convergence time for the greedy search. This technique is substantially better than the others. The worst-case convergence is 9 seconds, but the majority of the cases converge in under 5 seconds. While this technique is superior in theory, it is much harder to implement in practice due to measurement noise.

Figure 23:
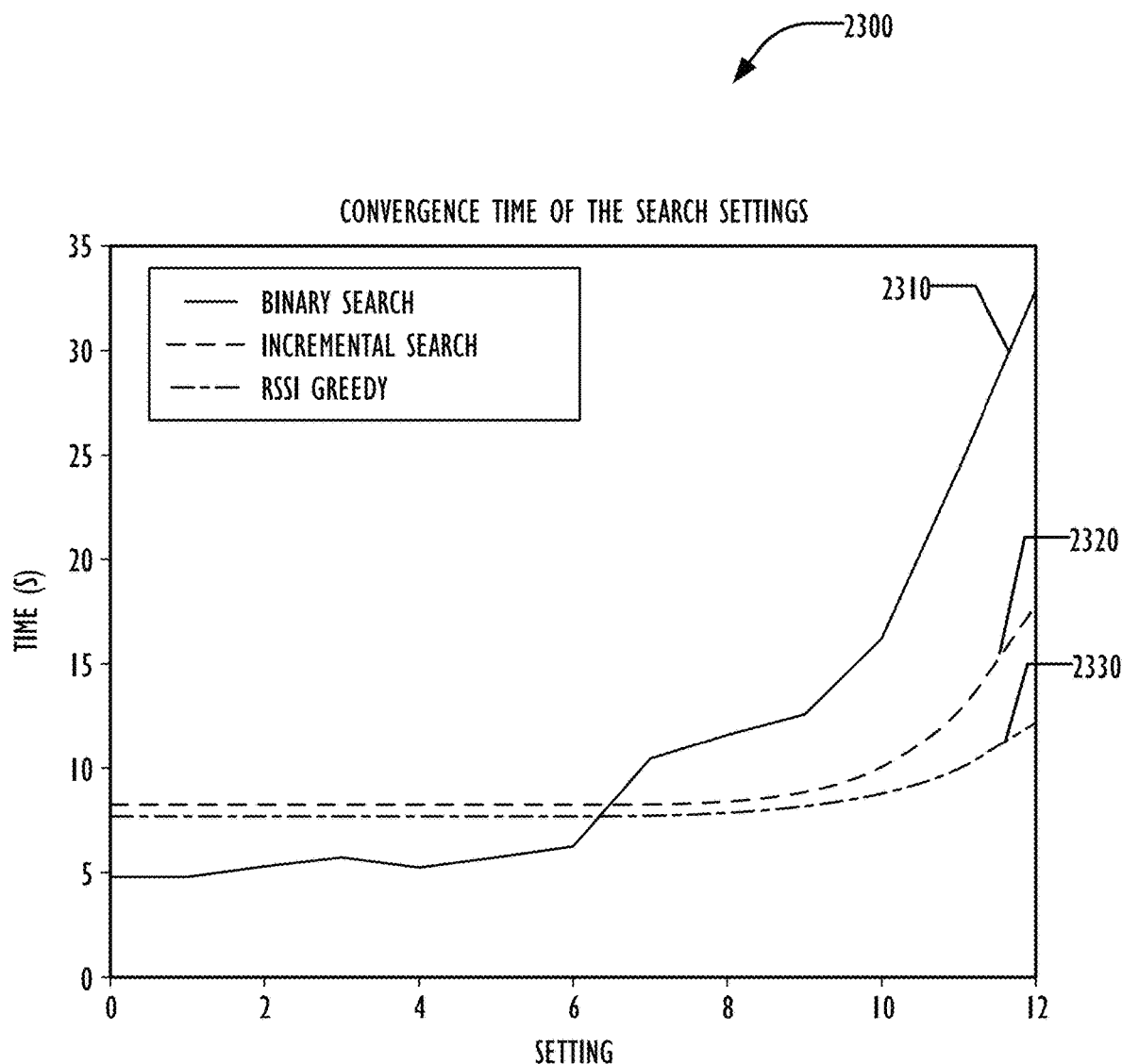
FIG. 23 is a graph illustrating the convergence times of three search techniques.

Simulations were performed using the search algorithms associated with each technique and the convergence times are illustrated in graph 2300 of FIG. 23, in which curve 2310 represents the binary search algorithm, curve 2320 represents the incremental search algorithm, and curve 2330 represents the greedy algorithm.

Effect of the Acknowledgement Setting

Timing differences between the two methods of ED acknowledgment (ack) may also have an effect. This acknowledgment is used by the master to validate that the ED has properly changed communication settings and can be transmitted in one of two ways:

1. Receive the change setting command, send the acknowledgment, and then drop to the decreased rate state; or
2. Receive the change setting command, drop to the decreased rate state, and then send the acknowledgment.

Figure 18:
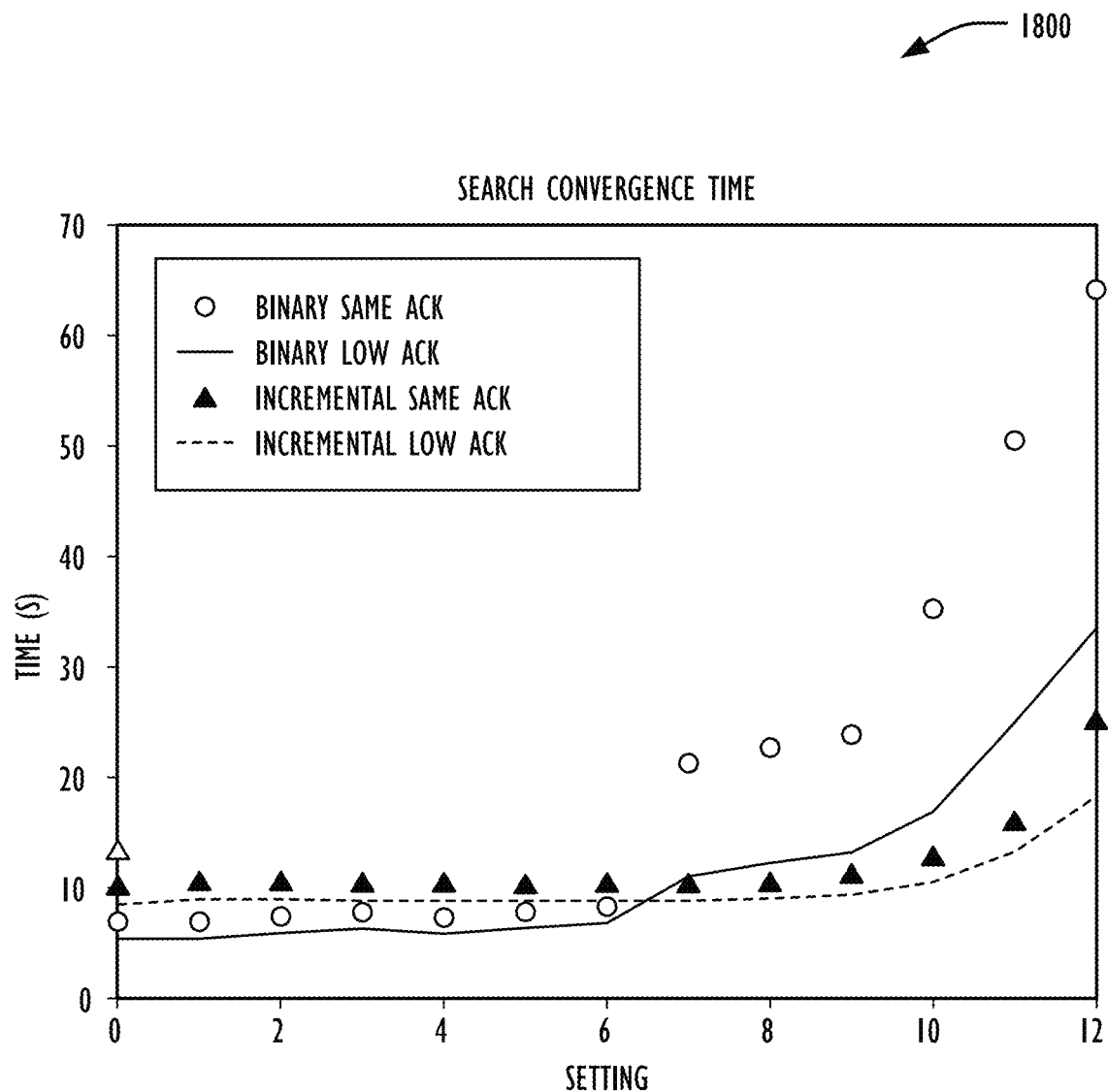
FIG. 18 is a graph illustrating the timing difference using different acknowledgment rates according to one embodiment.

Option 2 is faster because the master spends significantly less time receiving the acknowledgment. Even if the ED fails to respond and the error recovery process is invoked, the timeout value is lower for the next setting so the convergence will remain shorter. The effect of the faster acknowledgment on convergence times can be seen in graph 1800 illustrated in FIG. 18 for the binary and linear searches. The solid curves show the acknowledgment at the lower setting and the circles show the acknowledgment at the same setting. Both search methods take substantially longer when the ED acknowledgment is made at the same setting (Option 1).

The algorithms were implemented and tested on SAMR34 Xplained development boards created by Microchip Technologies. The SAMR34 contains a Semtech SX1276 LoRa module and an ARM Cortex M0+ MCU integrated onto a 6 mm×6 mm BGA package. It is tiny and easily configurable to achieve low power operation, making it well suited for wireless applications. The SAMR34 Xplained board has a programming interface, an antenna, and the RF circuitry needed to evaluate the SAMR34.

The SAMR34 includes a USB peripheral that is used for communicating with the device to control and view the status of the board while ADR is running. The firmware is developed using Atmel Studio and the data is logged using Tera Term.

The LoRa ICs are configured with the following settings:
Bandwidth of 62.5 kHz
6-symbol preamble
CRC is enabled
Implicit header is being used
Error coding rate of 4/5

The algorithms implement both a master and receive mode. The master binary and incremental search modes are initiated by typing a command through Tera Term. The ED mode is initiated by receiving a 'Go to ADR command' from a master. The ED receive mode function requires two timeouts:
1. A short-term timeout to return to the state that was last successfully communicated on
2. A long-term fail-safe timer to return to the starting setting if the ADR series is not properly terminated The algorithms were developed and tested. A timer was used in the master processor to measure the total convergence time during operations. To simulate long-range transmissions, the antenna was removed from a board. The boards were still able to communicate but at a significantly reduced range that allowed for easy collection of data in a confined space.

One important observation was that most communication errors came from the master missing the acknowledgment instead of the ED missing the command to change settings. This leaves the system in a state where the master is commanding the ED to go to a setting that it is already at. This motivated the final step of the error recovery process where the master drops to the next setting and pings the ED.

There were more packet transmission errors for communications than expected even if the settings were far above the optimal. This made the experimental data typically converge to a higher setting than was modeled. If the error occurred when the settings were 10-12, the experimental results were typically much higher than the model.

Our novel LoRa timing model was validated experimentally and then applied to analyze ADR techniques for ad hoc networks. The ADR technique extended LoRa to also use FSK when possible. Three different algorithms were considered, an incremental search, a binary search, and a greedy search using RSSI. Binary search is ideal when converging to high data rate settings but is slow to converge to the high SF settings. Incremental search outperforms the binary search for high settings but is consistently worse at converging to the FSK settings. The greedy search is superior but is the most challenging to implement due to noise in the RSSI and SNR of the system.

Figure 19:
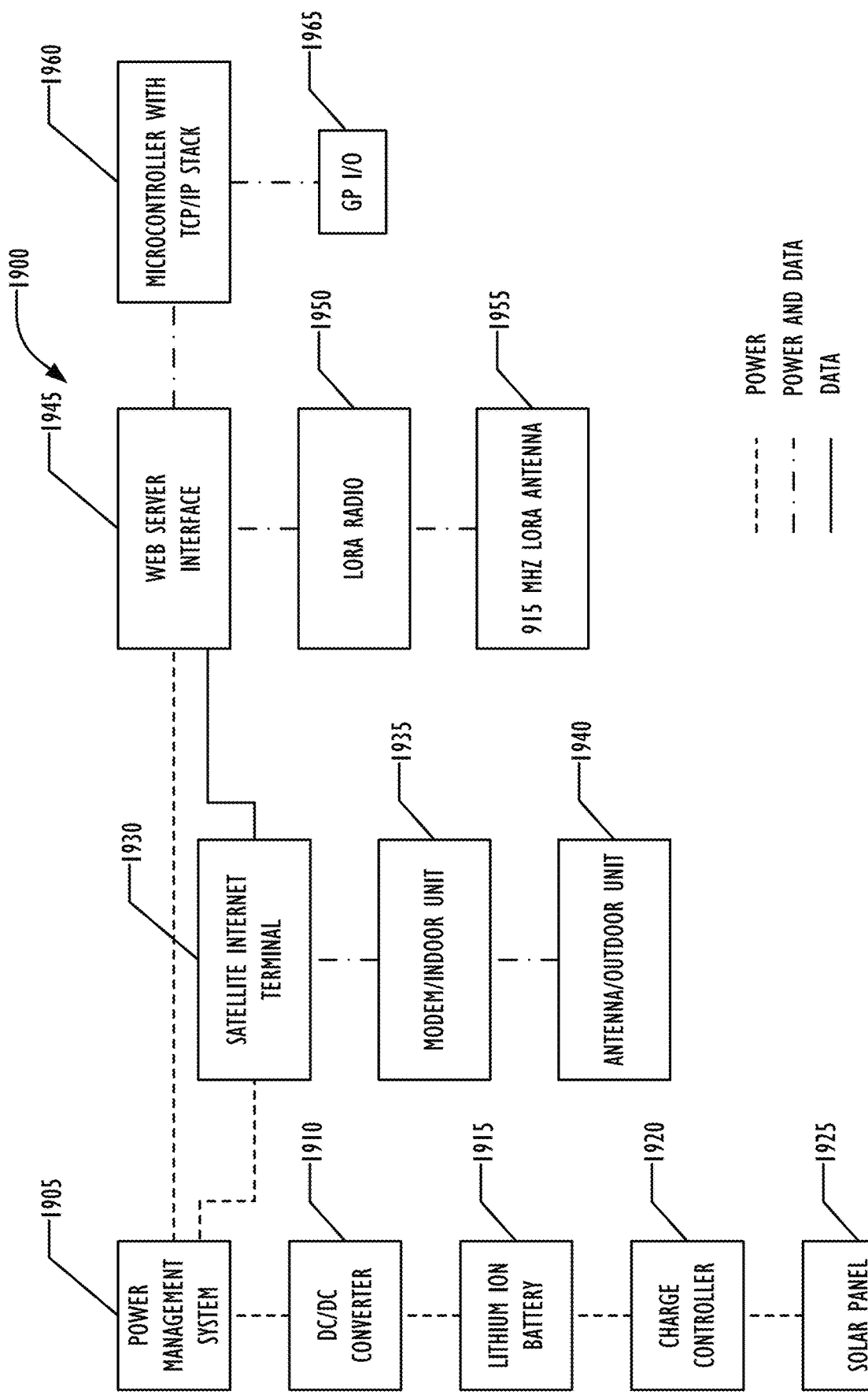
FIG. 19 is a block diagram illustrating components of a solar-powered base station for a remote animal monitoring system according to one embodiment.

FIG. 19 is a block diagram illustrating a system 1900 of components of the base station 200 according to one embodiment. A solar panel 1925 provides electrical power to the base station 200. A charge controller 1920 converts the output from the solar panel into suitable power for charging a lithium ion battery 1915. A DC/DC converter 1910 may then, under the control of a power management system 1905 convert the battery voltage to the desired voltage and amperage for use by the base station 200. If the base station is positioned in an area where electrical power is available, of course, these components could be omitted and main electrical power could be used with appropriate transformers.

Figure 20:
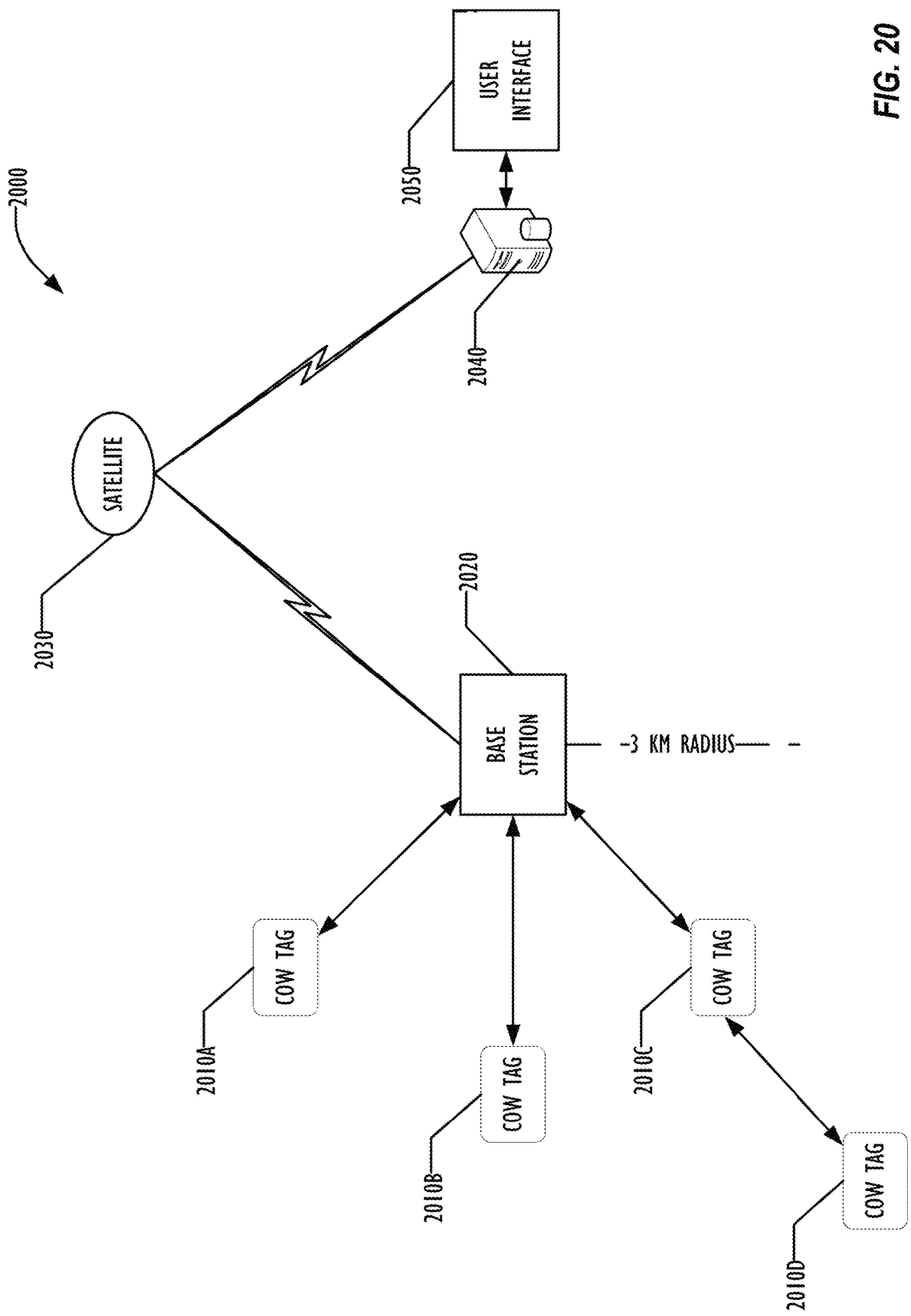
FIG. 20 is a block diagram illustrating a system for cattle monitoring according to one embodiment.

A satellite Internet terminal 1930, typically provided by the provider of the satellite Internet service, is powered by the power management system 1905 and provides the communication link between the base station 200 and the satellite 2030 (as illustrated in FIG. 20) used for communication to a remote computing server 2040. The satellite Internet terminal 1930 typically includes a satellite antenna 1940, such as a small dish antenna, which is mounted outside of an enclosure, while a modem 1935 is typically mounted inside an enclosure with the remainder of the base station for protection against the elements. If the base station is positioned in an area where Internet connectivity is available through other means, such as WiFi access or a cellular modem, then these satellite Internet components can be omitted and replaced with the Internet connectivity hardware necessary for the available Internet connection.

A microcontroller 1960 that contains a TCP/IP stack controls the behaviors of the base station 200. The microcontroller 1960 may be any desired type of microcontroller, such as an INTEL® microprocessor, and ARM® CORTEX® microcontroller, etc. (INTEL is a registered trademark of Intel Corp.; ARM and CORTEX are registered trademarks of ARM Limited.) A general-purpose I/O module 1965 allows I/O with other devices. A web server software 1945 communicates via the Internet to the remote computing server 2040, and in one embodiment may achieve Internet connectivity via a satellite Internet terminal 1930 and the satellite 2030. The base station 200 also includes a LoRa radio component 1950 and LoRa antenna 1955 for communicating with the sensor platforms 100. The microcontroller 1960 is programmed to execute software that comprises instructions that when executed cause the microcontroller 1960 to capture and analyze data received by the LoRa radio component 1950 and LoRa antenna 1955 from the sensor platforms 100 and then uploads that data via the web server software 1945 through the satellite Internet terminal 1930 to the remote computing server 2040.

In some embodiments, the base station 200 may also comprise NFC, cellular, WiFi, Bluetooth, or other similar components for making a connection between a local device and the base station 200 to allow the local device to communicate with the base station. For example, the general-purpose I/O module 1965 may allow for a Universal serial bus (USB) connection to the microcontroller 1960.

Depending on the size of the geographic area within which sensor platforms are distributed (for example, the land occupied by animals equipped with the sensor platform 100), multiple base stations 200 may be used, each communicating via the Internet to the remote computing server 2040.

Although the batteries used in the sensor platforms 100 and the base station 200 are lithium ion batteries, other types of batteries or other methods for autonomous power suitable for wireless devices may be used as desired.

FIG. 20 is a high-level overview illustrating a system for cattle monitoring employing the mesh network systems and techniques described above according to one embodiment. As illustrated in FIG. 20, cow tags 2010A, 2010B, and 2010C communicate with a base station 2020 directly and cow tag 2010D communicates via a hop through cow tag 2010C. The cow tags are attached to a cow and collect animal health, activity, and geolocation information, and analyze that information.

The cow tags 2010 can communicate with the base station 2020 over a wide area. In one embodiment the cow tags 2010 capable of being reached in one hop may be anywhere in a radius of approximately 3 km from the base station 2020, with additional cattle extending farther away reachable in multiple hops as described above, to a radius of approximately 10 km. The base station 2020 then communicates with a remote computing server 2040 using a satellite 2030 and satellite-based Internet. The remote computing server 2040 may store, aggregate, and analyze the collected data and may support software applications that communicate geospatially enabled animal information to an end user of the graphical user interface 2050 to view information about the cattle corresponding to the cow tags 2010. Although four cow tags 2010 are illustrated in FIG. 20 for clarity of the drawing, any number of animals can be monitored with the cow tags 2010, including hundreds of animals in our use-case with LoRa. The maximum range between the cow tags 2010 and the base station 2020 for communication in one hop may vary depending upon the operating environment and the particular communication technique and equipment deployed, but in general, the system 2000 can communicate between cow tags 2010 and base station 2020 over distances appropriate for cattle in outdoor grazing environments.

Firmware Update Using ADR Techniques

The following expands upon the ADR techniques described above by applying them to a firmware update process. The firmware update is provided as an example since it has a great deal of utility, however the process that we provide is applicable to any large data exchange.

1. A technique is described for energy-optimized firmware updates for mobile LoRa devices that is both secure and reliable.
2. The technique is designed to work in LoRa ad-hoc networks without LoRaWAN.
3. The technique leverages LoRa ADR techniques to minimize energy consumption by reducing the firmware image receive time.
4. A battery consumption approximation technique is provided to quantify the process energy expenditure.
5. A security assessment is performed to evaluate privacy and authenticity.

Figure 21:
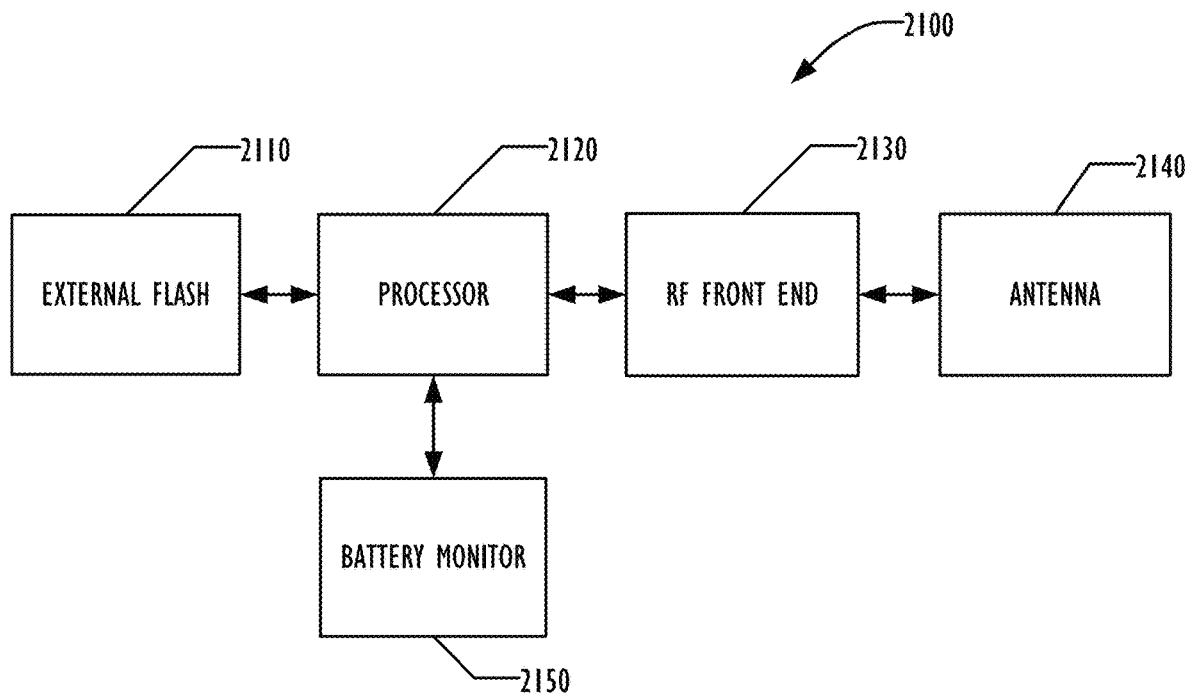
FIG. 21 is a block diagram illustrating a collection of hardware for updating firmware according to one embodiment.

The disclosed firmware update process is applicable to any device that uses the LoRa protocol or a functionally similar protocol and is equipped with additional memory to store the new code. The memory can be external to the processor or internal if the criteria in Eq. 10 are met. Here, $S_{Device}$ designates the total amount of flash memory, $S_{Application}$ represents the flash memory requirements of the application, and $S_{Bootloader}$ represents the requirements for the bootloader. FIG. 21 depicts the hardware components associated with a system 2100 according to one embodiment and includes components to carry out RF processing 2120-2140, battery monitoring 2150, and an external flash 2110 (if required). The battery monitor 2150 can vary in complexity but must be capable of approximating the remaining battery capacity, as discussed below.

$$S_{Device} \geq 2 S_{Application} S_{Bootloader} \tag{10}$$

Figure 25:
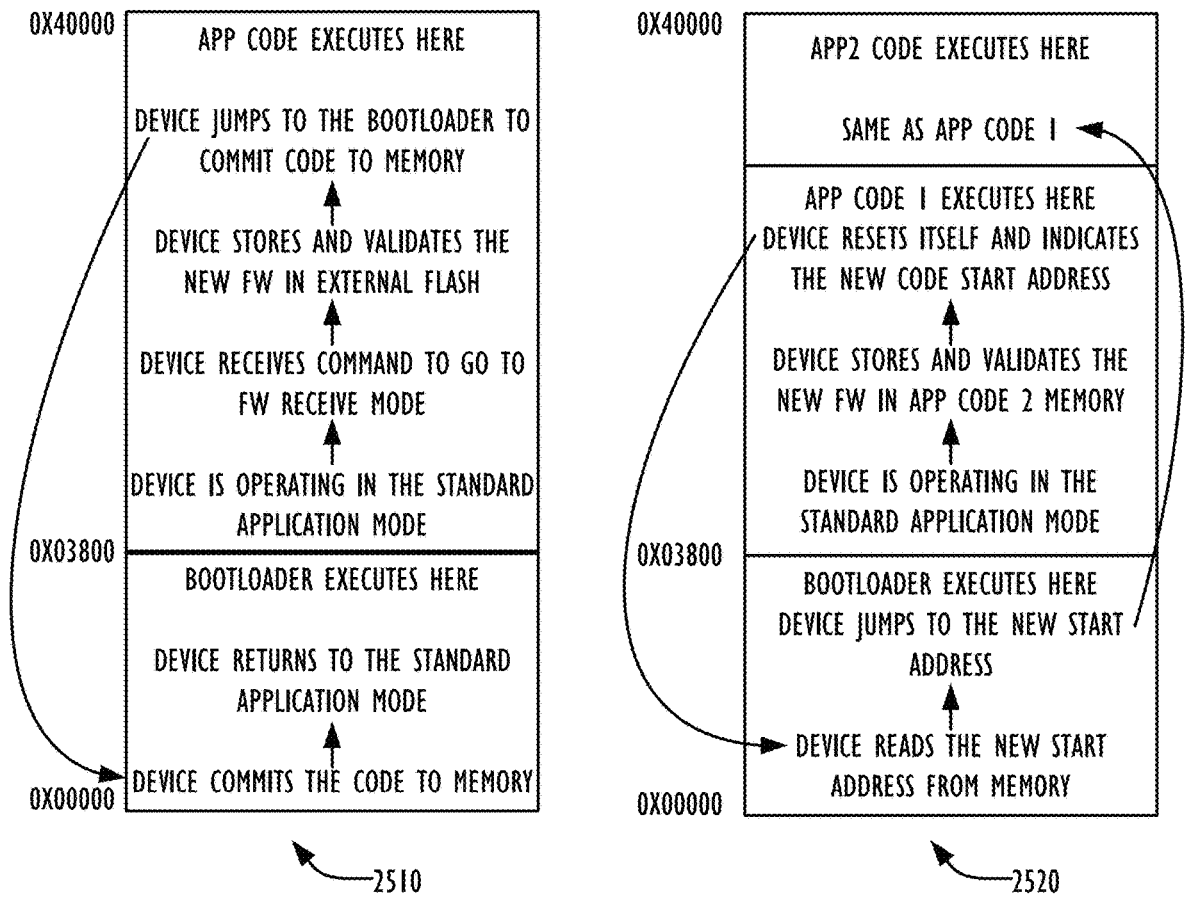
FIG. 25 is a pair of block diagrams illustrating flash memory breakdowns for an ED according to one embodiment.

The code resides in flash and is composed of a bootloader and the application code, as illustrated in FIG. 25, with block diagram 2510 illustrating a flash memory breakdown for using external flash memory and block diagram 2520 illustrating a flash memory breakdown for using internal flash memory. The application code is responsible for implementing the device functionality and must be re-based above the bootloader. The bootloader can modify and/or erase the application code residing in the flash memory. The bootloader must also be able to start executing the application code at different addresses depending on where the most recent application update was programmed. The firmware update process is defined as a sequence of five steps outlined below, with most of the functionality residing in the application code. The device will not execute the bootloader code to update the firmware unless it has validated the integrity of the new image and confirmed that there is sufficient battery power to rewrite the flash.

1. Initial Exchange: Establishes status and general configuration information.
2. ADR Rate Optimization: Finds the optimal communication setting with which to exchange the firmware.
3. Battery Approximation: Estimates total energy consumption for completing the update process and terminates the process if the battery capacity is insufficient.
4. Firmware Transfer: Sends the encrypted firmware image over the RF link.
5. Commit Code to Flash: After confirming that the firmware image is valid, the application hands control over to the bootloader to load the new application code, and then returns control to the new application.

The primary purpose of the initial exchange is to establish a common understanding of the firmware update status between the base station 200 and receiving device. The base station 200 initiates the firmware update by sending a packet 2210 with a short command and the device responds with a packet 2220 having the device ID, battery capacity and health status, and current firmware version. The device also transmits the status of any new firmware loaded into it and how much of the data has been transferred into the device. This information is relevant when a partial firmware update has occurred, to avoid re-transferring the same firmware image. The status of the device firmware update could be stored in the base station 200, but that would prevent the firmware from being loaded by multiple base stations, which is a capability that we want to maintain because a sensor platform could move out of range of the base station that it was initially communicating with and into the range of another base station.

Figure 22:
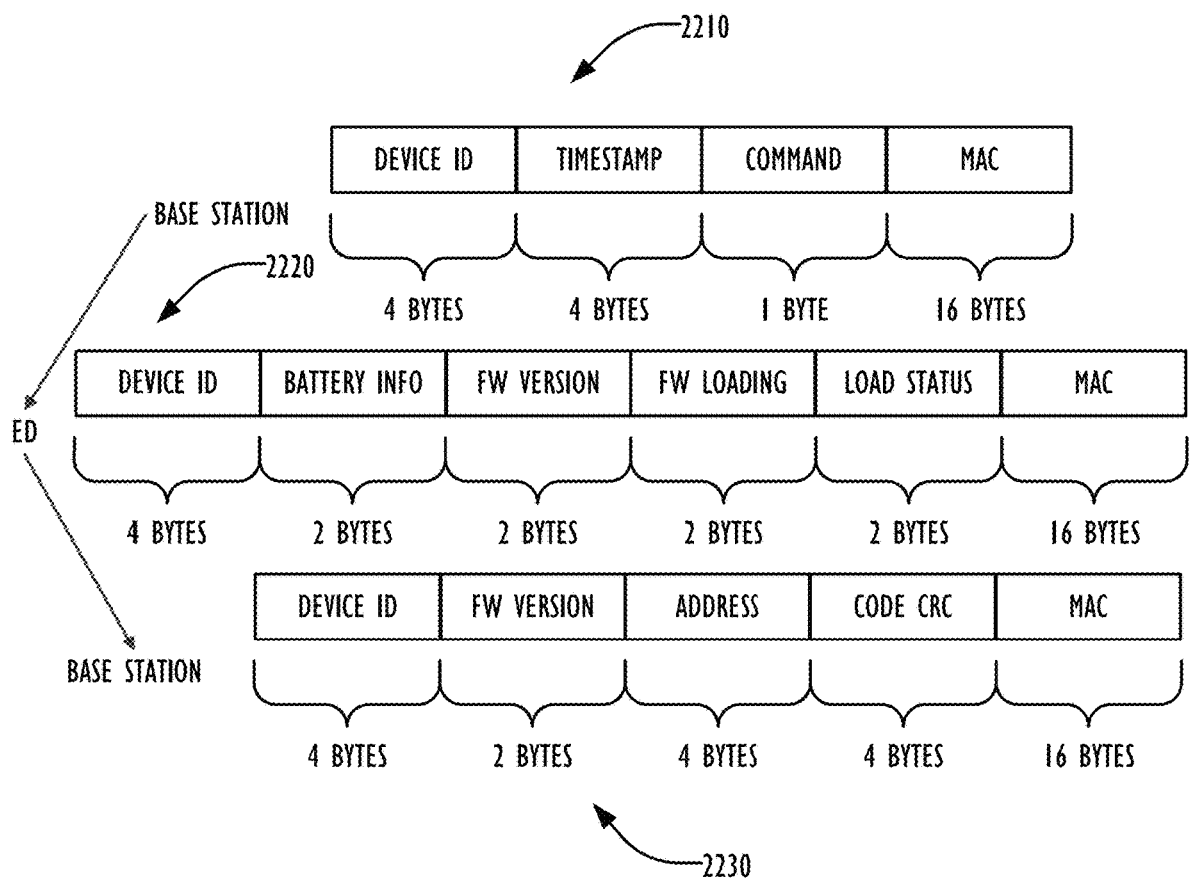
FIG. 22 is a block diagram illustrating a packet structure for updating firmware or other large data exchanges with a sensor platform according to one embodiment.

If it is determined that a new firmware update is required, the base station 200 sends a packet 2230 with a new firmware version number, the starting address to load the application code into memory, and the CRC of the entire firmware image. The starting address is needed for the bootloader to know where to load the code into memory and the CRC is used to verify that a valid firmware image has been received. If it is determined that an existing firmware update needs to continue, the base station 200 indicates that and continues the firmware upload. These communications are preferably signed using Advanced Encryption Standard-Cipher-based Message Authentication Code (AES-CMAC). These packet structures are defined in detail in FIG. 22. The packet structures illustrated in FIG. 22 are illustrative and by way of example only, and other packet structures may be used.

After defining the firmware update parameters, the next step is to identify the maximum data rate with reliable communications. The communications setting has a substantial impact on the total time to transfer data as shown above in Table 2. We leverage the results of the techniques for optimizing ADR transfers described above by applying them to the firmware update process. The parameter search space is limited to the 13 options shown in Table 2. We use all seven LoRa SF and six different bit rates with FSK. The extension here over previous ADR work to include the FSK parameters is beneficial because it enables significantly higher data rates when the devices are in close proximity. Moreover, there is no additional hardware required to enable FSK since every LoRa integrated circuit (IC) has FSK capabilities.

As described above and illustrated in graph 2300 of FIG. 23 with convergence curves 2310-2330, incremental, binary, and greedy RSSI optimal search techniques were explored. The binary search is most efficient when converging to lower settings but struggles at the higher settings. This is true because the device must fail more often at the higher settings to converge there. The incremental search is more efficient when a higher setting is required because it only fails once but is slower to converge to a lower setting because it must communicate on every setting. The RSSI optimal search is most efficient because the search process is eliminated. However, the additional overhead of obtaining an accurate RSSI value reduces its performance.

After finalizing an acceptable communication setting, the device will determine whether to initiate the firmware transfer based on whether the battery has sufficient energy to complete the operation. The total energy consumption is dependent on the size of the firmware image (i), the status of an existing firmware update ($i_s$), i.e., whether a partial image already exists, and the setting the data is transferred with (s). The energy consumption is partitioned into a data transfer portion and a portion required to carry out the application flash write operations as indicated in Eq. 11 below.

$$E_{update}(i,i_s,s) = E_{Transfer}(i,i_s,s) + E_{TAppFlashWrite}(i) \quad (11)$$

The data transfer can be further subdivided into the energy consumption associated with receiving data, transmitting acknowledgments, performing AES encryption, and writing the flash to store the firmware image, as shown by Eq. 12. Note that the flash write operation stores the image on the device but does not commit it to application memory. The received current is defined as ($I_{receive}$), the energy related to sending the packet acknowledgments is ($I_{transmit}$), the AES-current consumption is ($I_{AES}$), and the external flash write current is ($I_{extFlashwrite}$). The transmit and receive time depend on the communication setting but the AES and flash times are fixed. $V_s$ is the supply voltage and $\eta$ is the efficiency of the switch-mode power converter that supplies energy from the battery to the components. When calculating for the scenario when external flash is not being used, $T_{extFlashWrite}=0$.

$$E_{Transfer}(i, i_s, s) = \frac{(i - i_s)V_s}{\eta} \begin{pmatrix} I_{receive}T_{receive}(s) + \\ I_{transmit}T_{transmitreceive}(s) + \\ 2I_{AEs}T_{AEs} + \\ I_{extFlashWrite}T_{extFlashWrite} \end{pmatrix} \quad (12)$$

The energy to write the application flash depends solely on the firmware image size and is broken into the external memory read, AES encryption, and the application flash read and write, as shown in Eq. 13. The external memory read and AES encryption occur twice: first to validate the firmware image and the second is to load it into flash. When calculating for the scenario when external flash is not being used, $T_{extFlashRead}$ and $T_{AES}=0$. The specifics of this process will be covered in Section 2.5. Committing Code to Flash.

$$E_{AppFlashWrite}(i) = \frac{iV_s}{\eta} \begin{pmatrix} 2I_{extFlashRead}T_{extFlashRead} + \\ 2I_{AES}T_{AES} + \\ I_{FlashWrite}T_{FlashWrite} + I_{FlashWrite}T_{FlashWrite} \end{pmatrix} \quad (12)$$

After the setting and firmware image parameters are established, the device uses these energy consumption calculations to compute the expected battery capacity after completing the update. This is accomplished by using Eq. 13 where the capacity C is defined as the percent charge left in the battery, similar to what a phone or laptop computer would indicate for battery life. $B_{SOH}$ is the state of health of the battery which begins at 1 and degrades to 0 over time. Rechargeable batteries are generally rated to maintain 80% of the full capacity up to 2,000 cycles. The energy in a full battery ($E_{fullBattery}$) can be calculated by finding the rating of the battery in amp-hours, approximating the average output voltage, and then combining these to compute the total energy stored in the battery. The battery capacity estimation techniques are based on work in Heeger, D.; Partridge, M. E.; Trullinger, V.; Wesolowski, D. E. Lithium Battery Health and Capacity Estimation Techniques Using Embedded Electronics. Technical report, Sandia National Lab. (SNL-NM), Albuquerque, N. Mex. (United States), 2017.

$$C_{AfterUpdate}(i) = C_{Battery} - 100 \frac{E_{update}}{B_{SOH}E_{FullBattery}} \quad (13)$$

After computing the final capacity value, the device then determines if it can commit to the firmware update process. The exact threshold depends on several factors including the importance of the firmware update, the availability for the system to recharge, the external temperature, the consequence of a discharged battery, and the current capacity of the device. While the cutoff threshold is application-specific, a 50% threshold is used for the rest of this description. Assuming there is adequate energy in the battery, the system proceeds to the firmware transfer step of the update process.

Figure 24:
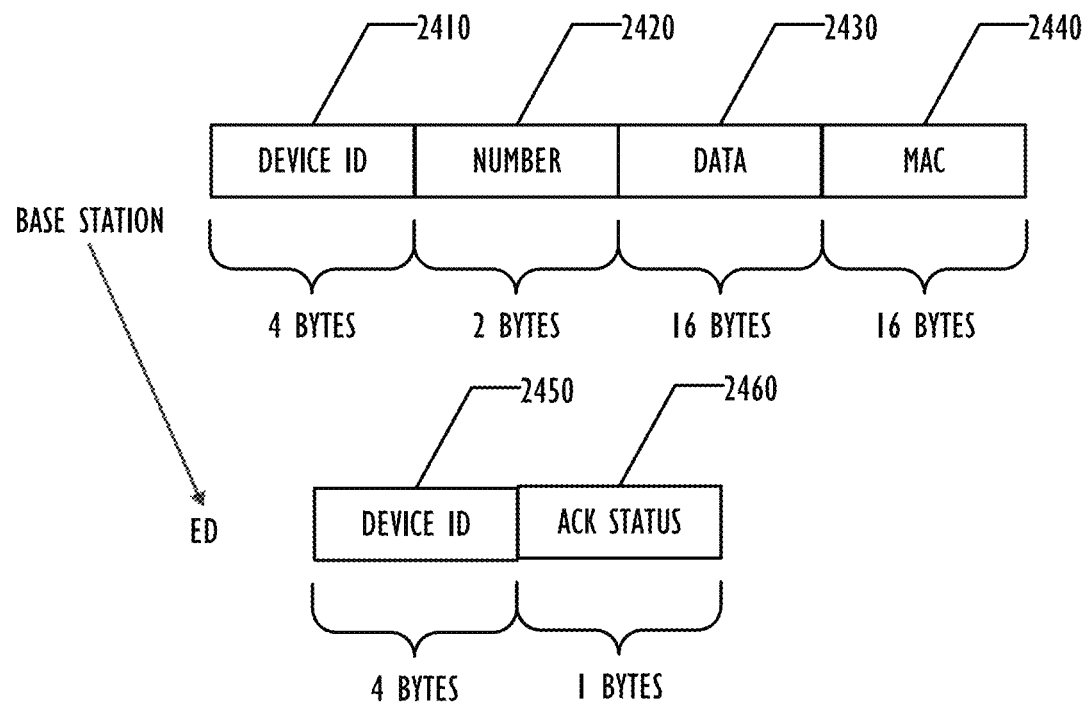
FIG. 24 is a block diagram illustrating packet structures for transferring a firmware update to an ED according to one embodiment.

The firmware transfer step involves the base station 200 transferring the firmware image to the device. The packet structure to transmit the firmware image illustrated in FIG. 24 includes the device ID 2410, the packet number 2420 that is being transmitted, 16-bytes of the encrypted firmware image 2430, and a 16-byte MAC 2440 to ensure authenticity. The device responds with a packet having a device ID 2450 and an Ack Status 2460 with either an acknowledgment (Ack) or negative acknowledgment (Nack) depending on the data arriving reliably and the MAC computing properly. The device stores the encrypted data in external memory as it is received. The data is encrypted because storing an un-encrypted image in the external memory would allow a malicious actor to read it out. If an Ack is received, the base station 200 sends the next packet number of the firmware. If a Nack is received, the base station 200 resends the same packet. This occurs 8,000 times to transfer the 16-byte encrypted data packets constituting the 128 kB firmware image. If the base station 200 does not receive a response or gets a Nack after three consecutive packet transfer attempts, the base station 200 may re-initiate the ADR to update the optimal communication setting. The base station 200 can also monitor the RSSI of the incoming packets from the device. If there is a significant increase in RSSI, the base station 200 can direct the device to a lower communication setting and speed up the data transfer.

After a firmware image is received, the device validates it before committing to execute it. The first validation step is the CRC computation, which is calculated by reading the image from memory, decrypting it, and then adding it to the CRC. The CRC computed over the entire image is compared to the CRC value that was sent during the initial exchange. If the two CRCs do not match, the firmware update process is restarted. Additional checks can be performed to increase confidence in the firmware image such as ensuring a minimum size and validating initial instructions.

Now that the image is validated, the device begins to execute the new application. The process varies significantly depending on whether external or internal memory is used. For the external memory case, the device confirms that there is sufficient battery to commit the code to flash, and then enters the bootloader to begin loading the memory. The bootloader reads and decrypts each 64-byte portion of the new firmware update, and then writes the data to flash. After each write, the bootloader reads the flash to check that there were no write errors. Upon completion, the processor resets and then jumps to the application code. In the scenario where external flash is not being used, the device bypasses the flash write step since the code already resides in application space. The device simply jumps to the new memory location (assuming the code is properly re-based) and begins execution. For future firmware updates, the device alternates the flash locations between App Code 1 and App Code 2 as indicated in block diagram 2520 of FIG. 25.

Before jumping to the new application, all interrupts and processor initialization must be disabled and the stack pointer and vector table are re-based. This enforces that everything is disabled by first resetting the processor, and then jumping to the new application from the bootloader prior to initializing anything. It is possible to jump to a new application directly without resetting the processor, but our technique strictly enforces that all interrupts and initialization are disabled.

The firmware update process described above was simulated and then implemented on the cattle monitoring sensor platform 100 for the scenario without using external flash. The application flash size met the criteria from Eq. 10, therefore it is used because it is more energy efficient than the alternate method.

Functional Characterization

We first collected simulation parameters by measuring each functional element of the transfer process including the AES, flash, and LoRa operations. These operations were implemented on a SAMR34 board to collect the timing and average current consumption values. Measured timing values were 200 μsec for the AES encode, 195 μsec for the AES decode, 170 μsec for the flash read, and 3.735 msec for the flash write operation. The flash write is the most expensive operation and cannot be completed without executing a page erase prior (the erase is included in the total 3.735 ms). The LoRa transmit and receive values are setting dependent and were experimentally validated in Heeger, D.; Garigan, M.; Plusquellic, J. Adaptive Data Rate Techniques for Energy Constrained Ad Hoc LoRa Networks. 2020 Global Internet of Things Summit (GIoTS). IEEE, 2020, pp. 1-6. The resulting simulation parameters used are provided below in Table 3.

TABLE 3

The settings used for modeling the firmware update parameters.

| Function | Time | Average Current |
| --- | --- | --- |
| AES Encode | 200 μs | 6.5 mA |
| AES Decode | 196 μs | 6.5 mA |
| Flash Read | 170 μs | 6.5 mA |
| Flash Write | 3.735 ms | 25.5 mA |
| LoRa Transmit | varies | 100 mA |
| LoRa Receive | varies | 10 mA |

Simulation

Figure 26:
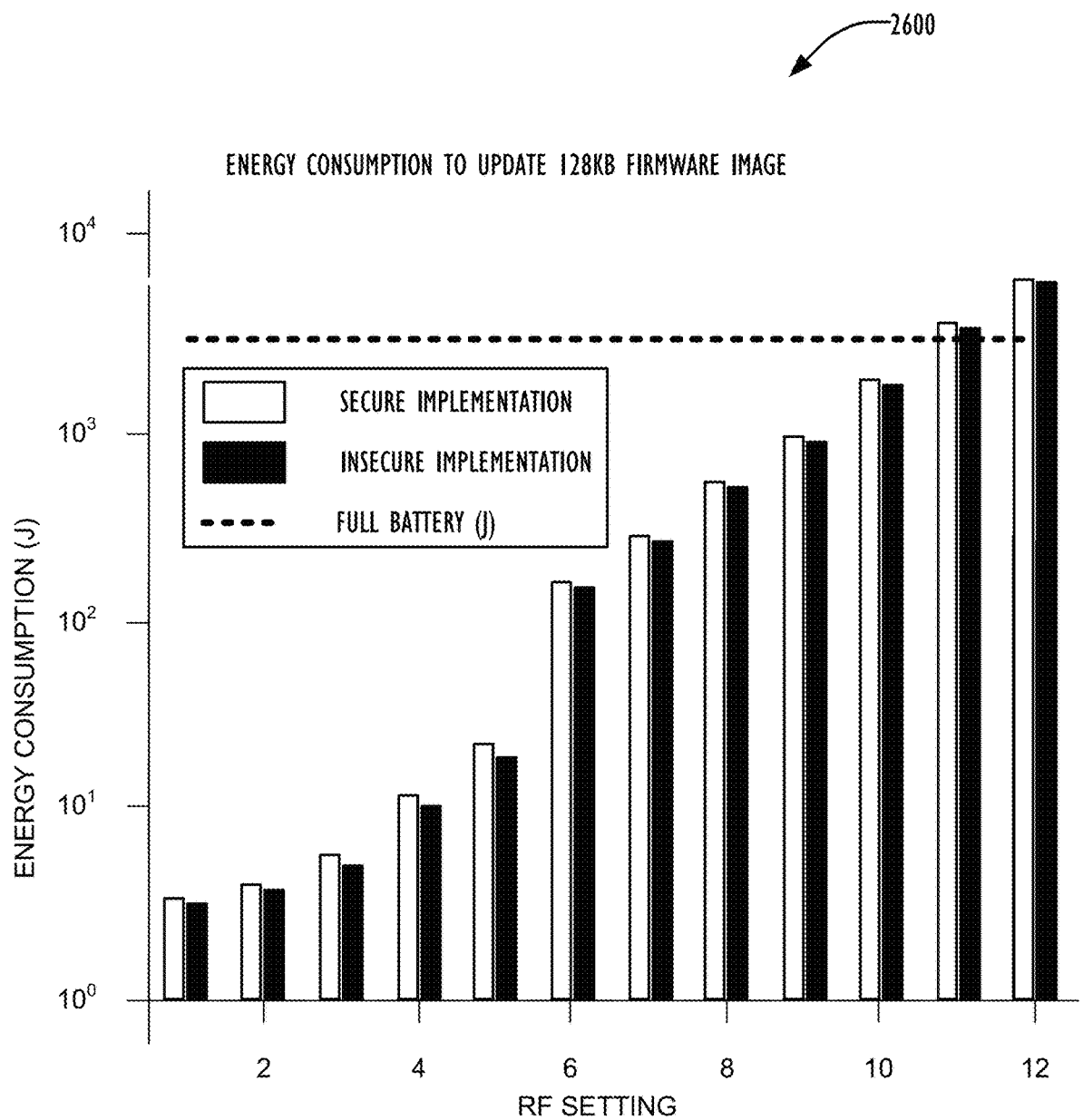
FIG. 26 is a graph illustrating energy consumption for updating a 128 KB firmware image according to one embodiment.
Figure 27:
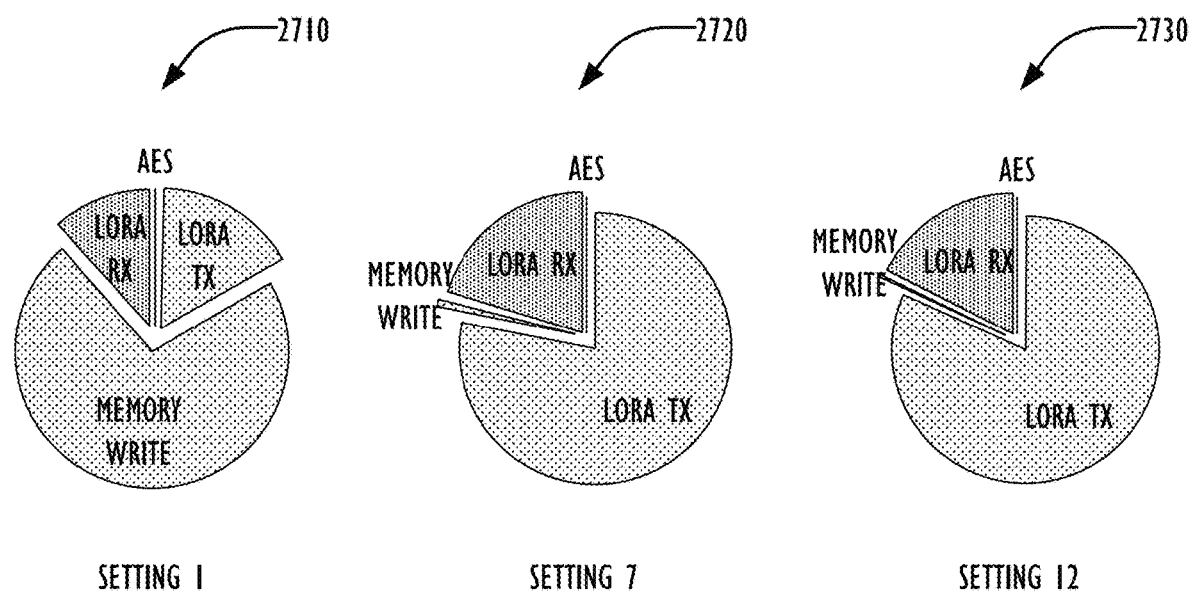
FIG. 27 is a set of pie charts illustrating relative energy breakdowns at different LoRa settings according to one embodiment.

Prior to implementation, the energy consumption was modeled for a 128 kB firmware image update for both the secure and insecure versions, as illustrated in graph 2600 of FIG. 26. The insecure version is similar to the secure version but lacks the encryption and MAC to authenticate each packet. The dashed line indicates the full capacity of a 200 mAh battery which is 2.8 kJ. The parameters used were: 1) LoRa Bandwidth=62.5 kHz, 2) 12-symbol preamble, 3) CRC enabled, 4) implicit header disabled, 5) error coding rate=5/4, 6) η=90%, 7) $V_s$=2.8V, 8) $I_{transmit}$=100 mA, and 9) $I_{receive}$=10 mA. Note that this modeling excludes the ADR portion as that was covered extensively above and its effect on this initial exchange is negligible. As shown in graph 2600, a 128 KB firmware image of this size cannot be updated with LoRa settings 11 and 12 on a single charge of this battery, due to the time and corresponding energy consumption required. The energy consumption decreases tremendously with each setting, motivating the need for good ADR performance. The insecure implementation is counter-intuitively close to the secure implementation but is clearer after observing pie charts 2710-2730 of FIG. 27, which show the relative energy breakdown at each setting. The AES operation is negligible in terms of power consumption because it is executed so efficiently in hardware. Despite the LoRa receive time being much longer for the higher settings, it is less significant since the transmit current is 10× the receive current. Therefore, most of the energy expenditure comes from the packet acknowledgment with the high LoRa settings. As the settings decrease, as in the case of setting 1, the memory write becomes the biggest relative burden since the RF communications are so quick.

The secure firmware transfer process was validated using a computer, a base station 200, and a sensor platform 100. The computer commands the update process with a .NET program by initiating the exchange, transmitting the image, and then requesting to start the new application code. In order to securely transfer the update, the program must parse the new firmware update file, encrypt the firmware image, generate the MAC, and then transfer this data through USB to the base station 200. For development and testing, a SAMR34 Xplained board served as the base station 200 and functions as a USB-to-LoRa converter to handle RF communications at 915 MHz. The last byte of the USB message indicates which setting to transmit and receive with, and then all the other bytes are transmitted over LoRa. In addition, the device data received by the base station 200 is relayed asynchronously into the computer along with the measured RSSI and SNR data. This custom code was developed and then loaded into the base station 200. The firmware for the sensor platform 100 consumes 30% of the firmware image and the bootloader consumes 25%, therefore we meet the criteria to store the next firmware update in internal flash memory. The sensor operation is simple after the ADR is complete and the initial code load address has been initialized. An interrupt is generated when a packet is received, the sensor platform 100 validates the packet is legitimate, decrypts the data, and then writes it to flash. Upon receiving a valid packet, an acknowledgment is sent to the base station 200 to confirm a successful transfer occurred. After the complete image has been transferred, a memory check is executed across the new code region. If the calculated CRC matches the desired CRC, a start application command is sent to cause the sensor platform 100 to reset itself to begin executing the new application code.

CONCLUSION

We have developed a novel secure ad-hoc mesh network architecture designed for wireless sensor platforms and other ultra-low-power applications. Our architecture may be applied to a cattle monitoring sensor network and addresses unique challenges related to cattle mobility and unpredictability. One embodiment uses GNSS clock data received at the device level to enable time-synchronized ad-hoc mesh routing operations performed by all networked devices. We define the packet structure and transmit/receive logic of the proposed protocol, and assess its performance and energy consumption over a variety of cattle distribution models to illustrate its suitability for energy-constrained IoT applications. Security extensions are described to provide privacy in data transmissions and authentication between devices in the network. Techniques enable low-power, secure large data exchanges, which may be applied to remote firmware updates for the sensor platforms 100.

While certain exemplary embodiments have been described in detail and shown in the accompanying drawings, it is to be understood that such embodiments are merely illustrative of and not devised without departing from the basic scope thereof, which is determined by the claims that follow.

We claim:
1. A low power wide-area mesh network for communicating data comprising:
　a base station comprising:
　　a microcontroller; and
　　a radio transceiver;
　a plurality of wireless sensor platforms, configured for communicating synchronously with the base station, wherein the plurality of wireless sensor platforms are autonomously powered;
　wherein the microcontroller of the base station is programmed to:
　　(a) begin an event by transmitting a synchronization packet over the radio transceiver at a fixed time interval after a previous event;
　　(b) receive a data packet from a first wireless sensor platform of the plurality of wireless sensor platforms via the radio transceiver;
　　(c) update the synchronization packet with an indication of each of the plurality of wireless sensor platforms from which data has been received, creating an updated synchronization packet;
　　(d) transmit the updated synchronization packet via the radio transceiver; and
　　repeat (b)-(d) until data is received from all of the plurality of wireless sensor platforms or a stop condition is reached; and wherein each wireless sensor platform of the plurality of wireless sensor platforms is programmed to:
　　receive a first synchronization packet;
　　receive a first data packet from another wireless sensor platform of the plurality of wireless sensor platforms;
　　create a second data packet containing sensor data generated by the each wireless sensor platform and sensor data contained in the data packet received from the another wireless sensor platform;
　　transmit the second data packet; and
　　transmit a second synchronization packet, wherein each synchronization packet comprises:
　　　a base station identifier;
　　　a round count that counts how many synchronization packets have been sent by the base station;
　　　a hop count that indicates a distance from the base station in hops of a transmitter of the synchronization packet; and
　　　a response field that indicates each of the plurality of wireless sensor platforms from which data has been received by the base station.

2. The low power wide-area mesh network of claim 1, wherein each synchronization packet further comprises:
　a timestamp; and
　a message authentication code,
　wherein each wireless sensor platform is further programmed to:
　　verify the message authentication code and timestamp; and
　　discard any received synchronization packet that fails verification.

3. The low power wide-area mesh network of claim 1, wherein each data packet comprises:
　a base station identifier;
　a hop count that indicates a distance from the base station in hops of a transmitter of the data packet;
　a herd identifier corresponding to a herd; and
　a cattle data field, containing subfields for each cattle in the herd.

4. The low power wide-area mesh network of claim 3, wherein the cattle data field is encrypted.

5. The low power wide-area mesh network of claim 1, wherein the base station is further programmed to:
　receive a firmware update for a wireless sensor platform of the plurality of wireless sensor platforms from a firmware server; and
　transmit the firmware update to the wireless sensor platform using an adaptive data technique.

6. The low power wide-area mesh network of claim 5, where the firmware update is encrypted.

7. The low power wide-area mesh network of claim 1, wherein each of the plurality of wireless sensor platforms wakes up from a sleep state on a time synchronized schedule to perform a mesh networking event.

8. A method of communicating with a plurality of sensor platforms by a base station comprising:
　(a) beginning an event by transmitting a synchronization packet over a radio transceiver at a fixed time interval after a previous event;
　(b) receiving a data packet from a first sensor platform of the plurality of sensor platforms via the radio transceiver;
　(c) updating the synchronization packet with an indication of each of the plurality of sensor platforms from which data has been received, creating an updated synchronization packet;

(d) transmitting the updated synchronization packet via the radio transceiver; and repeating (b)-(d) until data is received from all of the plurality of sensor platforms or a stop condition is reached, wherein each synchronization packet comprises:
- a base station identifier;
- a round count that counts how many synchronization packets have been sent by the base station;
- a hop count that indicates a distance from the base station in hops of a transmitter of the synchronization packet; and
- a response field that indicates each of the plurality of sensor platforms from which data has been received by the base station, and wherein each data packet comprises:
- a base station identifier;
- a hop count that indicates a distance from the base station in hops of a transmitter of the data packet;
- a herd identifier corresponding to a herd; and
- a cattle data field, containing subfields for each cattle in the herd.

9. The method of claim 8, wherein the stop condition is a predetermined number of rounds.

10. The method of claim 8, wherein the stop condition is a round during which no data is collected.

11. The method of claim 8, wherein each synchronization packet further comprises:
- a timestamp; and
- a message authentication code, further comprising:
- verifying the message authentication code and timestamp; and
- discarding any received synchronization packet that fails verification.

12. The method of claim 8, wherein the cattle data field is encrypted.

13. A method of communicating with a base station of a mesh network, comprising:
receiving a first synchronization packet by a first sensor platform of a plurality of sensor platforms;
receiving a first data packet from a second sensor platform of the plurality of sensor platforms;
creating a second data packet containing sensor data generated by the first sensor platform and sensor data contained in the first data packet received from the second sensor platform;
transmitting the second data packet; and
transmitting a second synchronization packet, wherein the first data packet and the second data packet both comprise:
- a base station identifier;
- a hop count that indicates a distance from the base station in hops of a transmitter of the data packet;
- a group identifier corresponding to a defined group of networked devices; and
- a data field, containing subfields for each device in the defined group.

14. The method of claim 13, further comprising:
creating the second synchronization packet by updating a hop count of the first synchronization packet.

15. The method of claim 13, wherein creating the second data packet comprises:
updating a data field of the second data packet with data from the first data packet in a time slot corresponding to the second sensor platform.

16. The method of claim 13 wherein the first synchronization packet and second synchronization packet both comprise:
a timestamp; and
a message authentication code, further comprising:
- verifying the message authentication code and timestamp; and
- discarding any received synchronization packet that fails verification.

17. The method of claim 13, further comprising:
encrypting a data field of the second data packet.

* * * * *